(12) United States Patent
Nizamidin et al.

(10) Patent No.: US 11,898,094 B2
(45) Date of Patent: Feb. 13, 2024

(54) SYSTEMS AND PROCESSES FOR IMPROVED DRAG REDUCTION ESTIMATION AND MEASUREMENT

(71) Applicant: Chevron U.S.A. INC., San Ramon, CA (US)

(72) Inventors: Nabijan Nizamidin, Houston, TX (US); Harold C. Linnemeyer, Sugar Land, TX (US); Timothy P. Theriot, The Woodlands, TX (US); Gojko Matovic, Cypress, TX (US); Seung Han, Katy, TX (US); Do Hoon Kim, Katy, TX (US); Kerry K. Spilker, Houston, TX (US)

(73) Assignee: Chevron U.S.A. INC.

( * ) Notice: Subject to any disclaimer, the term of this patent is extended or adjusted under 35 U.S.C. 154(b) by 516 days.

(21) Appl. No.: 17/104,514

(22) Filed: Nov. 25, 2020

(65) Prior Publication Data

US 2021/0198557 A1    Jul. 1, 2021

Related U.S. Application Data

(63) Continuation-in-part of application No. 16/697,426, filed on Nov. 27, 2019, now Pat. No. 11,085,259.
(Continued)

(51) Int. Cl.
*C09K 8/62* (2006.01)
*C09K 8/60* (2006.01)
(Continued)

(52) U.S. Cl.
CPC .............. *C09K 8/62* (2013.01); *C09K 8/602* (2013.01); *E21B 43/26* (2013.01); *E21B 47/00* (2013.01); *G01N 11/04* (2013.01); *G06F 30/28* (2020.01); *C09K 2208/08* (2013.01); *C09K 2208/28* (2013.01)

(58) Field of Classification Search
CPC ...... C09K 8/62; C09K 8/602; C09K 2208/08; C09K 2208/28; C09K 8/035; E21B 43/26; E21B 47/00; E21B 43/2607; G01N 11/04; G06F 30/28; G06F 2113/08; G06F 2113/14
See application file for complete search history.

(56) References Cited

U.S. PATENT DOCUMENTS 2,826,060 A    3/1958   Gordon
3,502,220 A    3/1970   Kohlberg
(Continued)

OTHER PUBLICATIONS

Liang et al., "A new approach to predict field-scale performance of friction reducer based on laboratory measurements", 159 J. Petr. Sci. and Engineer. (2017), pp. 927-933.
(Continued)

*Primary Examiner* — Steven W Crabb
(74) *Attorney, Agent, or Firm* — Hunton Andrews Kurth LLP

(57) ABSTRACT

The present invention relates generally to systems and processes for improved drag reduction estimation and measurement and more specifically to portable drag reduction analyzers and processes for upscaling drag reduction data for a variety of field applications. A drag reduction parameter ΔB for the fluid mixture is used for determining drag reduction for a fluid mixture in an oil field or pipeline operation.

24 Claims, 27 Drawing Sheets

Related U.S. Application Data

(60) Provisional application No. 62/941,008, filed on Nov. 27, 2019.

(51) Int. Cl.

| | | |
|---|---|---|
| *G01N 11/04* | (2006.01) | |
| *E21B 43/26* | (2006.01) | |
| *E21B 47/00* | (2012.01) | |
| *G06F 30/28* | (2020.01) | |

(56) References Cited

U.S. PATENT DOCUMENTS

| | | |
|---|---|---|
| 3,773,438 A | 11/1973 | Hall et al. |
| 3,957,637 A | 5/1976 | Morey |
| 4,402,215 A | 9/1983 | Guastavino |
| 4,534,869 A | 8/1985 | Seibert |
| 4,700,567 A | 10/1987 | Frey et al. |
| 4,726,219 A | 2/1988 | Pearson et al. |
| 4,850,750 A | 7/1989 | Cogbill et al. |
| 4,901,563 A | 2/1990 | Pearson |
| 5,257,528 A | 11/1993 | Degouy et al. |
| 5,297,420 A | 3/1994 | Gilliland et al. |
| 5,841,879 A | 11/1998 | Scofield |
| 5,847,268 A | 12/1998 | Ball |
| 7,100,427 B2 | 9/2006 | Kahn et al. |
| 7,231,973 B2 | 6/2007 | Sloan |
| 7,377,169 B2 | 5/2008 | Myers et al. |
| 7,736,521 B2 | 6/2010 | Sloan et al. |
| 7,805,982 B2 | 10/2010 | Hilab |
| 7,832,257 B2 | 11/2010 | Weightman et al. |
| 8,122,759 B2 | 2/2012 | Weightman et al. |
| 8,383,560 B2 | 2/2013 | Pich et al. |
| 8,683,858 B2 | 4/2014 | Piri |
| 8,714,247 B1 | 5/2014 | Berger et al. |
| 8,853,136 B2 | 10/2014 | Bittner et al. |
| 9,103,193 B2 | 8/2015 | Coli et al. |
| 10,168,265 B2 | 1/2019 | Dwarakanath et al. |
| 10,436,693 B2 | 10/2019 | Dwarakanath et al. |
| 2002/0011450 A1 | 1/2002 | Kelly et al. |
| 2006/0020427 A1 | 1/2006 | Kahn et al. |
| 2008/0064614 A1* | 3/2008 | Ahrenst .................. C09K 8/68 |
| | | 507/221 |
| 2009/0090504 A1 | 4/2009 | Weightman et al. |
| 2009/0095481 A1 | 4/2009 | Pich et al. |
| 2010/0000508 A1 | 1/2010 | Chandler |
| 2010/0083730 A1 | 4/2010 | Le et al. |
| 2010/0224365 A1* | 9/2010 | Abad .................. E21B 43/26 |
| | | 166/275 |
| 2010/0292110 A1 | 11/2010 | Pope et al. |
| 2011/0118153 A1 | 5/2011 | Pich et al. |
| 2012/0018148 A1 | 1/2012 | Bryant et al. |
| 2012/0074069 A1 | 3/2012 | Ripley et al. |
| 2012/0199355 A1 | 4/2012 | Boluk et al. |
| 2012/0127466 A1 | 5/2012 | Karnes et al. |
| 2013/0041587 A1* | 2/2013 | Gomaa .................. E21B 43/26 |
| | | 702/6 |
| 2013/0104630 A1 | 5/2013 | Varni et al. |
| 2013/0191046 A1 | 7/2013 | Henning et al. |
| 2013/0264020 A1 | 10/2013 | De Wolf et al. |
| 2013/0298644 A1 | 11/2013 | Dean et al. |
| 2014/0116689 A1 | 5/2014 | Bittner et al. |
| 2014/0332473 A1 | 11/2014 | Haberman et al. |
| 2015/0168284 A1 | 6/2015 | Minton et al. |
| 2015/0343348 A1 | 12/2015 | Morris et al. |
| 2016/0084024 A1 | 3/2016 | Dillard et al. |
| 2016/0097247 A1 | 4/2016 | Marco et al. |
| 2016/0122622 A1 | 5/2016 | Dwarakanth et al. |
| 2016/0122623 A1 | 5/2016 | Dwarakanth et al. |
| 2016/0122624 A1 | 5/2016 | Dwarakanth et al. |
| 2016/0122626 A1 | 5/2016 | Dwarakanth et al. |
| 2017/0284918 A1 | 10/2017 | Palazzo et al. |
| 2018/0010994 A1 | 1/2018 | Macomber |
| 2020/0116613 A1 | 4/2020 | Linnemeyer et al. |

OTHER PUBLICATIONS

Zhou et al., "An Effective Model of Pipe Friction Prediction from Laboratory Characterization to Field Applications for Friction Reducers", SPE 146674-MS (2011).

Shah et al., "Methodology for Evaluating Drag Reduction Characteristics of Friction Reducer", SPE 189537-MS (2018).

Gul et al., "A Data Driven Approach to Predict Frictional Pressure Losses in Polymer-Based Fluids", SPE 194132-MS (2019).

* cited by examiner

SYSTEMS AND PROCESSES FOR IMPROVED DRAG REDUCTION ESTIMATION AND MEASUREMENT

CROSS-REFERENCE TO RELATED APPLICATIONS

This application claims priority to U.S. provisional patent application 62/941,008 filed Nov. 27, 2019 which application is incorporated herein by reference. The application also claims priority to U.S. non-provisional application Ser. No. 16/697,426 filed Nov. 27, 2019 which is also incorporated herein by reference.

FIELD OF THE INVENTION

The present invention relates generally to systems and processes for improved drag reduction estimation and measurement and more specifically to portable drag reduction analyzers and processes for upscaling drag reduction data for a variety of field applications.

BACKGROUND AND SUMMARY

Drag reducing agents also called, among other names, drag reducers or friction reducers are commonly employed in many applications to, for example, reduce frictional pressure loss during fluid flow in a conduit or pipeline in a variety of applications. A few common applications include, for example, hydraulic fracturing, pipelines, injecting fluid, produced water, water transportation, disposal wells, irrigation or other well systems, and the like. There are a wide variety of drag reducing agents that include, for example, various polymers, fibers, surfactants, and boosters.

Unfortunately, current testing procedures of drag reducing properties of various agents requires large stationary equipment. Moreover, testing results are performed in the laboratory or small-scale flow loop and do not accurately predict drag reduction on a larger scale such as in the field. In particular, typical field conditions are not easily producible in a laboratory or small-scale flow loop. Accordingly, what is needed are systems and methods that more reliably predict or estimate drag reduction on a larger scale in the field. It would further be advantageous if testing systems could be made to be portable for small scale testing in the field. Advantageously, the instant inventions meet those needs and may have additional advantages that can lead to, for example, improved oil and/or gas production, better control of fracturing, and improved well design.

In one embodiment the application pertains to a process comprising preparing a fluid mixture for an oil field operation or a pipeline operation. The fluid mixture may comprise a concentration of a drag reducing agent determined based on a drag reduction parameter $\Delta B$ for the fluid mixture. The fluid mixture may then be used in the oil field operation or the pipeline operation.

In another embodiment the application pertains to a process comprising preparing a fluid mixture for an oil field operation or a pipeline operation. The fluid mixture generally comprises a concentration of a drag reducing agent determined based on a drag reduction parameter $\Delta B$ for the fluid mixture. The fluid mixture may be used in the oil field operation or the pipeline operation. The process may further comprise measuring one or more fluid properties of the fluid mixture in a laboratory, a flow loop, a portable apparatus, or any combination thereof. A small-scale drag reduction parameter $\Delta B$ may be determined for the fluid mixture based on the one or more fluid properties of the fluid mixture measured in the laboratory or the flow loop. The small-scale drag reduction parameter $\Delta B$ may be upscaled for use in the oil field operation or the pipeline operation. An analytical model may be used for upscaling the small-scale drag reduction parameter $\Delta B$ for use in the oil field operation or the pipeline operation.

In another embodiment the application pertains to a process to determine drag reduction for a fluid mixture for an oil field operation or a pipeline operation. The process comprises measuring one or more fluid properties of a fluid mixture comprising a concentration of a drag reducing agent in a laboratory, flow loop, or with a portable apparatus, or any combination thereof. A small-scale drag reduction parameter $\Delta B$ may be determined for the fluid mixture based on the one or more fluid properties. The small-scale drag reduction parameter $\Delta B$ may be used to determine a target fluid mixture for use in the oil field operation or the pipeline operation.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate preferred embodiments of this invention, and are therefore not to be considered limiting of its scope, for the invention may admit to other equally effective embodiments that vary only in detail. In the drawings.

DESCRIPTION OF THE PREFERRED EMBODIMENTS

Figure 1A:
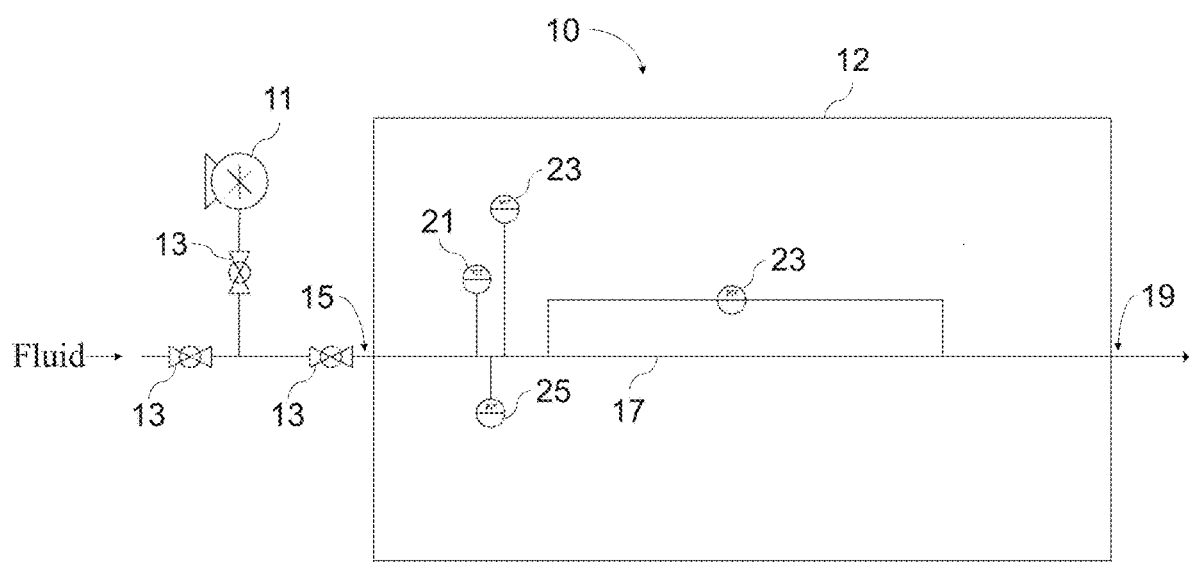
FIGS. 1A-G illustrate example embodiments of a portable apparatus for analyzing drag reduction.

Certain terms are used throughout the following description and claims to refer to particular system components. As one skilled in the art will appreciate, different companies may refer to a component by different names. This document does not intend to distinguish between components that differ in name but not function.

Other definitions: The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

Unless defined otherwise, all technical and scientific terms used herein have the same meanings as commonly understood by one of skill in the art to which the disclosed invention belongs. All citations referred herein are expressly incorporated by reference.

Portable Apparatus for Analyzing Drag Reduction and Associated Processes

In one embodiment the invention pertains to a portable apparatus for analyzing drag reduction. By portable, it is meant that the apparatus may easily be transported from site to site. For example, the portable design of the apparatus can permit the apparatus to be readily transported to often remote locations (e.g., to sites in the field where fluids are being used) and used to analyze fluids, particularly those that include one or more drag reducing agents. In addition to improving portability, the relatively small footprint of the apparatus allows for the apparatus to be deployed in a wider variety of locales (e.g., in smaller rooms or facilities that lack the available space for a full-scale analytical laboratory). This allows for once complex analytical operations to be efficiently performed on-site using a single, portable piece of equipment.

In some embodiments, the assembled portable apparatus can have a footprint of 25 square feet or less (e.g., 20 square feet or less, 15 square feet or less, 12.5 square feet or less, 10 square feet or less, 9 square feet or less, 8 square feet or less, 7 square feet or less, 6 square feet or less, 5 square feet or less, or 4 square feet or less). In some embodiments, the assembled portable apparatus can have a footprint of at least 2 square feet (e.g., at least 3 square feet, at least 4 square feet, at least 5 square feet, or at least 6 square feet).

The assembled portable apparatus can have a footprint ranging from any of the minimum values described above to any of the maximum values described above. For example, the assembled portable apparatus can have a footprint of from 2 to 25 square feet (e.g., from 2 to 15 square feet, from 2 to 10 square feet, or from 4 to 8 square feet).

In some embodiments, the assembled portable apparatus can occupy a volume of 35 cubic feet or less (e.g., 30 cubic feet or less, 25 cubic feet or less, 20 cubic feet or less, 15 cubic feet or less, 12.5 cubic feet or less, 10 cubic feet or less, 9 cubic feet or less, 8 cubic feet or less, 7 cubic feet or less, 6 cubic feet or less, 5 cubic feet or less, or 4 cubic feet or less). In some embodiments, the assembled portable apparatus can occupy a volume of at least 2 cubic feet (e.g., at least 3 cubic feet, at least 4 cubic feet, at least 5 cubic feet, at least 6 cubic feet, at least 7 cubic feet, or at least 8 cubic feet).

The assembled portable apparatus can occupy a volume ranging from any of the minimum values described above to any of the maximum values described above. For example, the assembled portable apparatus can occupy a volume of from 2 to 35 cubic feet (e.g., from 2 to 15 cubic feet, from 2 to 10 cubic feet, or from 2 to 8 cubic feet).

The components of the apparatus can be self-contained and assembled within a housing. This allows for the apparatus to be rapidly deployed. For example, setup times can be short enough to allow the portable apparatus to be up and running in a matter of hours. This is significantly shorter than the setup time required for a typical full-scale analytical laboratory.

Typically, the apparatus comprises a housing encompassing a pipe with an inlet to receive a fluid. The pipe may be of any suitable conduit, dimensions, and material so long as it is capable of carrying the fluid from the inlet to an outlet of the pipe. Thus, the specific pipe, dimensions, and material may vary depending upon the desired application, type of fluid, and properties to be analyzed by the apparatus. A suitable range to allow for drag reduction measurements in a portable apparatus for the pipe inner diameter is greater than approximately 0.25 inches and less than approximately 0.75 inches. For example, the portable apparatus can have a single pipe diameter of approximately 0.25 inches, approximately 0.3 inches, approximately 0.4 inches, approximately 0.5 inches, approximately 0.6 inches, or approximately 0.75 inches. In one example, the portable apparatus comprises two pipes of different diameters (e.g., a first pipe having a diameter ranging from approximately 0.25 inches to approximately 0.4 inches such as 0.3 inches and a second pipe having a diameter of approximately 0.5 inches to approximately 0.75 inches such as 0.6 inches). In another example, the portable apparatus three pipes of various diameters (e.g., a first pipe having a diameter ranging from approximately 0.25 inches to approximately 0.35 inches such as 0.3 inches, a second pipe having a diameter of approximately 0.35 inches to approximately 0.55 inches such as 0.4 inches, and a third pipe having a diameter of approximately 0.55 inches to approximately 0.75 inches such as 0.6 inches).

The apparatus typically has a pump to direct the fluid from the inlet through the pipe to an outlet of the pipe. The type of pump is not particularly critical so long as it can appropriately direct the fluid to be tested at a desired flow rate without degrading the drag reducer within the fluid. Examples of pumps that can be utilized include low-shear positive displacement pumps such as progressive cavity pumps commercially available by Moyno and Seepex GmbH. Typically, the pump and/or one or more of the other components of the apparatus is capable of adjusting the flow rate of the fluid. The manner of adjusting the flow rate is not critical so long as it is adjustable over the range of flow rates to be studied or employed. In one embodiment, the pump is able to generate a flow rate of between at least 2 gallons per minute and to less than 30 gallons per minute. If the pump does not directly adjust the flow rate, then the flow rate may be adjusted by, for example, a pressure regulator, a control valve and a vent port, a pressure relief valve, or any combination of these or other devices.

In some embodiments, a pump is not necessary. For example, the portable apparatus can be connected or teed into a main flow line (e.g., injection line in a hydraulic fracturing operation) such that it obtains a slipstream sample of the fluid to be tested. In this case flow can be controlled using a pressure regulator, a control valve and a vent port, a pressure relief valve, a needle valve or any combination of these or other devices. The pressure and flow rate in the main flow line is sufficient to supply the portable apparatus such that fluid properties of the fluid can be measured.

Typically, the apparatus is configured with one or more instruments to measure one or more fluid properties. Such properties may be selected from flow rate, fluid temperature, inlet pressure, outlet pressure, a differential pressure across the pipe, or any combination thereof. Thus, typical instruments may include, for example, a pressure gauge or pressure transducer or pressure indicator transmitter (PIT), thermocouple or temperature probe or temperature indicator transmitter (TIT), a flow meter or flow transducer or flow indicator transmitter (FIT), or any combination thereof. In some embodiments, the apparatus may also be configured with additional instruments to measure fluid properties such as a pH probe, a conductivity probe, an Oxidation-Reduction Potential (ORP) probe, or any combination thereof.

A data acquisition system is usually provided to receive data from the one or more instruments to measure one or more fluid properties. The data acquisition system is often programmed so that it is capable of determining drag reduction of the fluid from data it receives. The data acquisition system may be any convenient system and may comprise, for example, a processor, a monitor, and/or a keyboard or other data entry capability. A power supply is typically coupled to the pump, the one or more instruments, and the data acquisition system. The power supply employed is not particularly critical so long as it is capable of supplying the necessary power at the locations where the portable apparatus may be employed. Thus, a source of power may include, for example, electrical, solar, battery such as lithium ion or other battery, wind, etc.

If it is desired to measure more than one fluid simultaneously, then the portable apparatus may comprise a second, a third, or even more additional pipes. The additional pipes can receive fluid from the inlet (e.g., via a tee or multi-way valve) and expel fluid to the outlet (e.g., via a tee or multi-way valve), or alternatively each pipe in the apparatus can be associated with a separate inlet to receive fluid and a separate outlet to expel the fluid from the apparatus. The effluent fluid can be recirculated back to inlet 15 for additional testing, can be reintroduced into the fluid being injected into a subterranean reservoir, can be treated and disposed of as waste, or any combination thereof. The additional pipes, if any, are usually configured with one or more instruments to measure one or more additional pipe fluid properties selected from flow rate, fluid temperature, inlet pressure, outlet pressure, a differential pressure across the second pipe, or any combination thereof. The instruments associated with added pipes may be configured to operably connect to the same or a different data acquisition system. In this manner, data received from the one or more instruments to measure one or more added pipe fluid properties may be used to determine drag reduction from data received.

If desired, the portable apparatus may be operably connected to a hydraulic fracturing system. In this manner, drag reduction of a potential fracturing fluid comprising drag reducing agents (or even lacking such agents) may be determined at any desirable stage in the fracturing process. For example, drag reduction of a potential fracturing fluid may be determined prior to pumping the fracturing fluid into a borehole. In this manner one could, for example, employ a portable apparatus downstream, upstream, or both of a blender to determine the effects the blender may have on a potential fracturing fluid.

The processes of using the portable apparatus typically comprise flowing a fluid through the apparatus and then determining the drag reduction. For example, if employed with a hydraulic fracturing system comprising a blender, then one portable apparatus may operably be connected to the hydraulic fracturing system upstream of the blender while a second portable apparatus is operably connected to the hydraulic fracturing system downstream of the blender to determine drag reduction of the fracturing fluid. In some embodiments drag reduction of a first fluid can be compared with drag reduction of a second fluid such that adjustments may be made. For example, one or more hydraulic fracturing parameters could be adjusted based on the comparison. Such parameters include, for example, those selected from drag reducing agent, amount of drag reducing agent, flow rate, proppant, amount of proppant, or any combination thereof. The portable apparatus may also be used in conjunction with the below upscaling embodiments to obtain laboratory data or flow loop data which can then be upscaled.

FIG. 1A shows an example portable apparatus 10 for measuring drag reduction. The portable apparatus 10 can comprise a housing 12 encompassing one or more components of the portable apparatus. As shown, pump 11 may direct fluid for which a drag reduction measurement is desired through one or more valves 13 to an inlet 15 of apparatus 10. The fluid may come from a process line or any other source. For example, the fluid may comprise an injection solution used in a hydraulic fracturing operation. Apparatus 10 may be disposed upstream of a blender (not shown) that mixes the fracturing fluids or downstream of a blender such that fluid exiting apparatus 10 at outlet 19 is disposed just prior to fluid being injected in a wellbore into a formation. Valves 13 can be used to regulate the amount or rate of fluid directed to apparatus 10.

Various instruments may be utilized to measure one or more fluid properties. The location of each instrument may vary depending upon the desired configuration and testing conditions. FIG. 1A depicts temperature indicator transmitter (TIT) 21 to measure a temperature of the fluid, pressure indicator transmitters (PIT) 23 to measure an inlet pressure and/or a pressure differential across pipe 17, and flow indicator transmitter (FIT) 25 measures a flow rate of the fluid received by apparatus 10. Typically, temperature indicator transmitter (TIT) 21, pressure indicator transmitter (PIT) 23, and flow indicator transmitter (FIT) 25 are disposed proximate to inlet 15 of apparatus 10 such that properties of the fluid entering apparatus 10 can be measured. A pressure indicator transmitter (PIT) 23 is also used to measure a pressure differential across pipe 17. Drag reduction of the fluid is determined based on the measurements from the instruments.

Figure 1B:
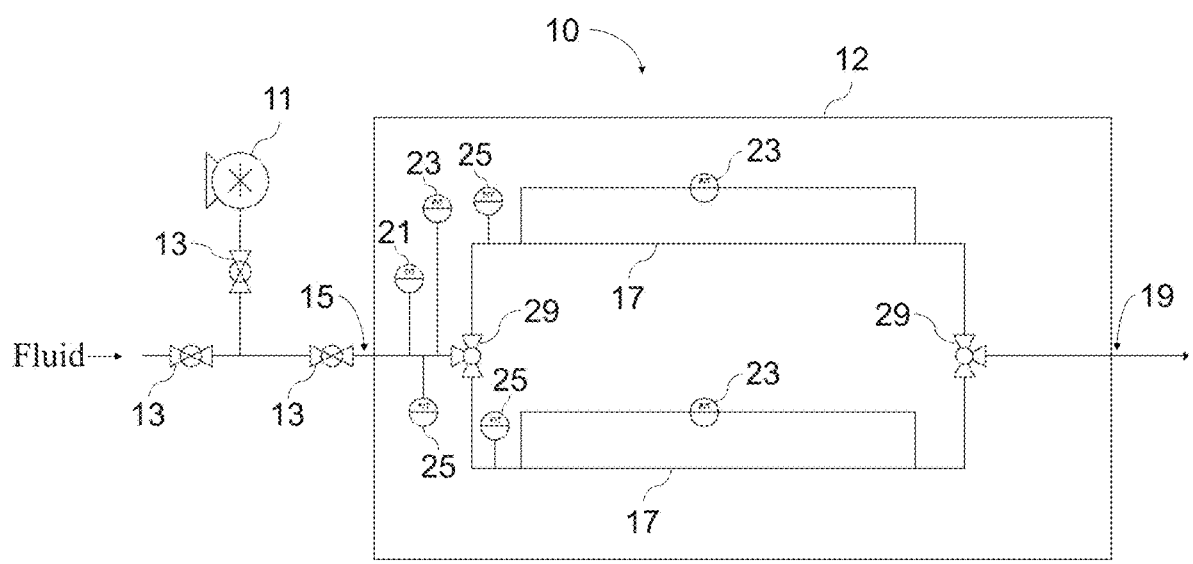

While FIG. 1A depicts a single pipe to measure fluid properties, a suitable system may have two pipes, or more than two pipes, for analyzing fluid properties. FIG. 1B shows another example apparatus 10 for measuring drag reduction having two pipes 17 to measure fluid properties. Here, three-way valves 29 are employed to route the fluid to be tested through various pathways through apparatus 10 from the inlet 15 to the outlet 19. For example, since apparatus 10 of FIG. 1B has two pipes 17, three-way valves 29 could divert a portion of the fluid entering apparatus 10 to each pipe 17 such that measurements are taken simultaneously in each pipe 17 or three-way valves 29 could divert all the fluid through a single pipe 17 such that only a single measurement is taken (i.e., a pressure differential of fluid flowing through each pipe 17 can be tested simultaneously or separately using pressure indicator transmitters (PIT) 23 and flow indicator transmitters (FIT) 25). Note that additional flow indicator transmitters (FIT) 25 are placed along each pipe 17 to allow for simultaneous measurements through each pipe 17. In some embodiments, the diameters of pipe 17 in the separate lines are the same. In some embodiment, the diameters of pipe 17 in the separate lines are different.

Figure 1C:
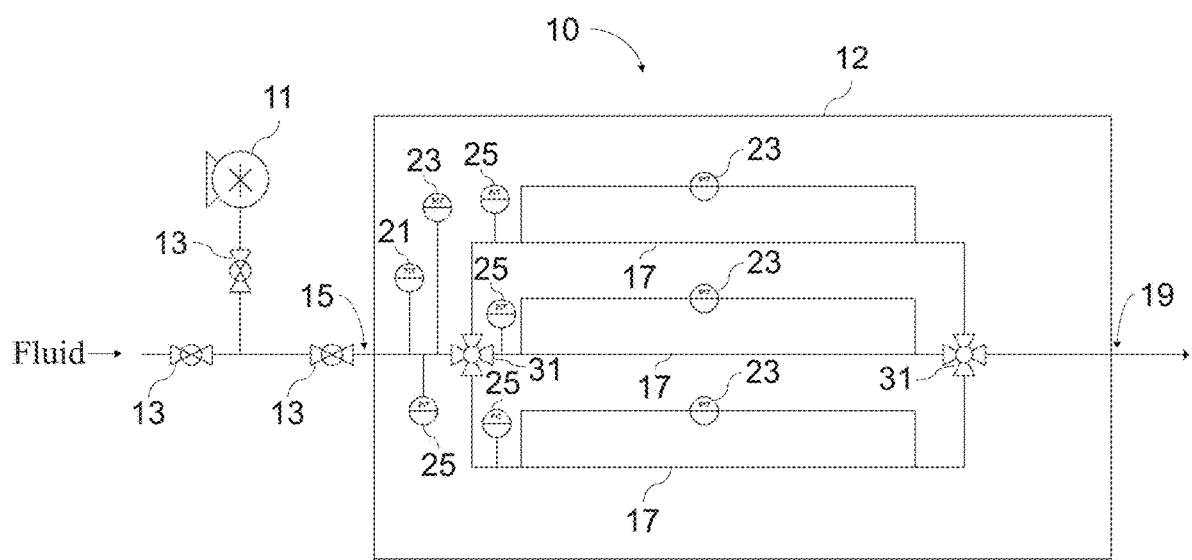

FIG. 1C shows another example apparatus 10 for measuring drag reduction having three pipes 17 to measure fluid properties. Here, four-way valves 31 are employed to route the fluid to be tested through various pathways through apparatus 10 from the inlet 15 to the outlet 19. For example, since apparatus 10 of FIG. 1B has three pipes 17, four-way valves 31 can divert a portion of the fluid entering apparatus 10 to each pipe 17 such that measurements are taken simultaneously in each pipe 17, four-way valves 31 can divert a portion of the fluid through only two of pipes 17 such that two measurements are taken, or four-way valves 31 can divert all the fluid through a single pipe 17 such that only a single measurement is taken (i.e., a pressure differential of fluid flowing through each pipe 17 can be tested simultaneously or separately using pressure indicator transmitters (PIT) 23 and flow indicator transmitters (FIT) 25). Note that additional flow indicator transmitters (FIT) 25 are placed along each pipe 17 to allow for simultaneous measurements through each pipe 17. In some embodiments, the diameters of pipe 17 in the separate lines (e.g., upper, middle, and lower as shown) are the same. In some embodiment, the diameters of pipe 17 in the separate lines (e.g., upper, middle, and lower as shown) are different.

Figure 1D:
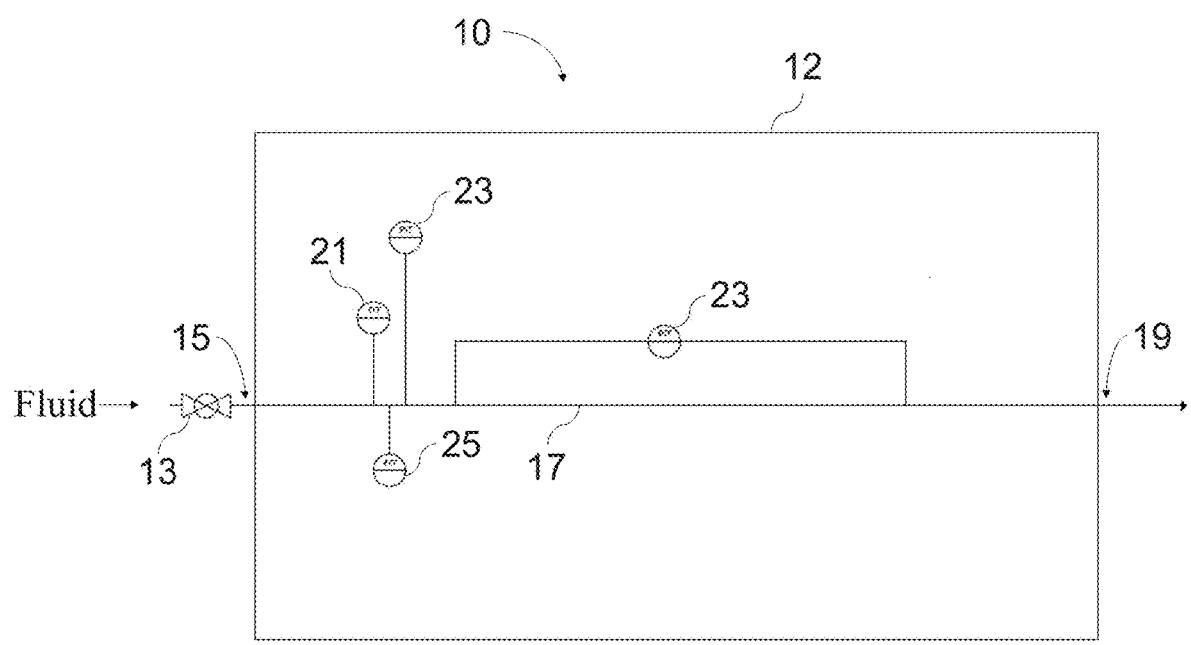

FIG. 1D shows an example apparatus 10 for measuring drag reduction where a pump is not utilized. For example, the portable apparatus can be connected or teed into a main flow line (e.g., injection line in a hydraulic fracturing operation) such that it obtains a slipstream sample of the fluid to be tested. The pressure and flow rate in the main flow line is sufficient to supply the portable apparatus such that fluid properties of the fluid can be measured. All other functionality of apparatus 10 in FIG. 1D remains the same as shown in FIG. 1A.

Figure 1E:
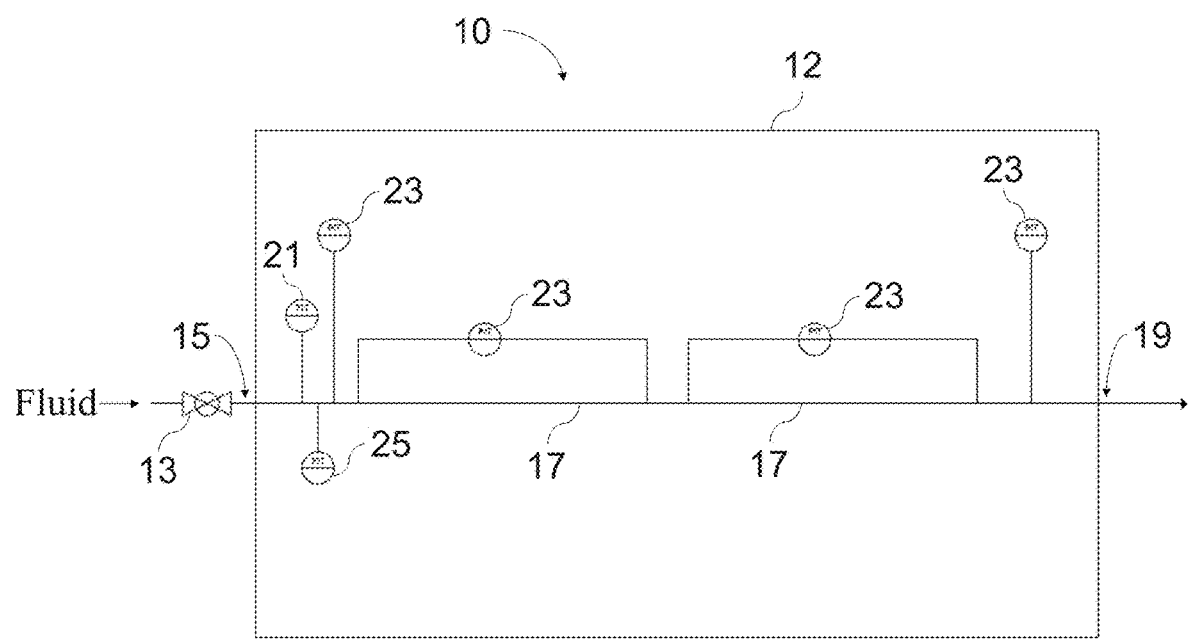

FIG. 1E shows another example apparatus 10 for measuring drag reduction having two pipes 17 arranged in series to measure fluid properties. Here, measurements can be taken simultaneously in each pipe 17 (i.e., a pressure differential of fluid flowing through each pipe 17 can be tested simultaneously using pressure indicator transmitters (PIT) 23). In some embodiments, the diameters of pipe 17 in the separate lines are the same. In some embodiment, the diameters of pipe 17 in the separate lines are different. In additional embodiments, more than two pipes are arranged in series where a pressure differential of fluid flowing through each pipe 17 is tested simultaneously using separate pressure indicator transmitters (PIT) 23.

Figure 1F:
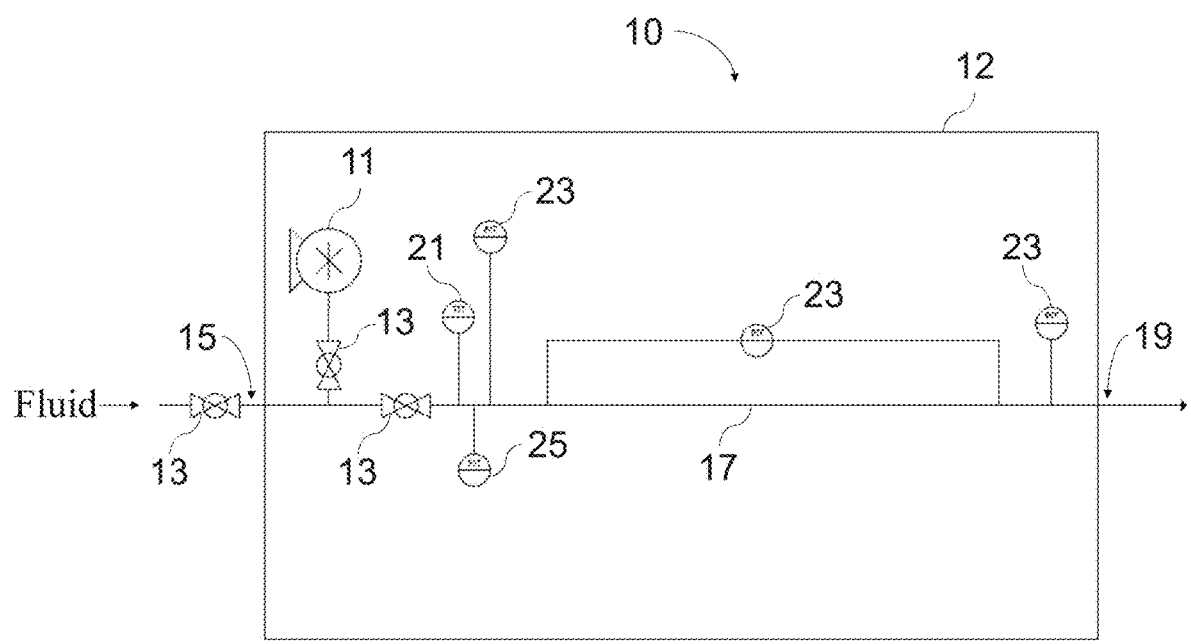

FIG. 1F shows an example apparatus 10 for measuring drag reduction where pump 11 and one or more valves 13 are disposed inside housing 12 of apparatus 10. Further, while not necessary, an additional pressure indicator transmitter (PIT) 23 is shown prior to outlet 19 to measure outlet pressure. While not depicted in FIGS. 1A-1C, outlet pressure could additionally be measured by placing a pressure indicator transmitter (PIT) 23 prior to outlet 19 if desired (e.g., to confirm accurate measurements of differential pressure measured across each pipe 17). All other functionality of apparatus 10 in FIG. 1D remains the same as shown in FIG. 1A.

Figure 1G:
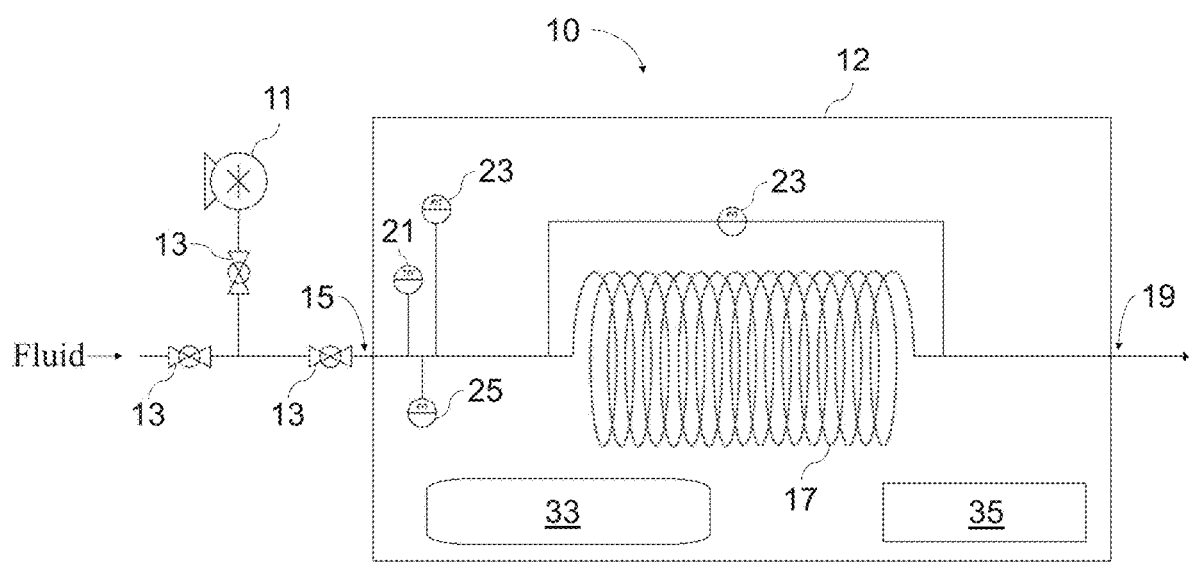

FIG. 1G shows an example apparatus 10 for measuring drag reduction where pipe 17 is arranged inside apparatus 10 as a coil. This coil arrangement facilitates a longer pipe length of pipe 17 in which a pressure differential can be measured. While not depicted in FIGS. 1A-1F, each pipe 17 in these embodiments can also be configured as a coil.

A data acquisition system 33, which is usually provided to receive data from the one or more instruments (21, 23, 25) to measure one or more fluid properties. The data acquisition system 33 may be located within housing 12 of apparatus 10 as shown in FIG. 1E, coupled to apparatus 10, or may be remote if a communication system is provided to send the data from the instruments (21, 23, 25) to the data acquisition system 33. In some embodiments, the data acquisition system can also communicate with pump 11, valves 13, or other controllers (not shown) to regulate the amount of fluid, rate of fluid, and/or fluid pathway/route that fluid travels through apparatus 10 between inlet 15 and outlet 19. A power supply 35 is operably connected to the instruments (21, 23, 25), pump 11, and data acquisition system 33. The power supply 35 may be a common supply for all the components or separate for some or all of the components. While not depicted in FIGS. 1A-1F, apparatus 10 can also encompass data acquisition system 33 and power supply 35 within housing 12 similar to FIG. 1G.

Upscaling Processes

As previously discussed, testing results performed in the laboratory or flow loop do not accurately predict drag reduction observed in field applications. In general, this is due to the laboratory or flow loop conditions being measured on much smaller equipment than what is used in the field. For example, laboratory or flow loop equipment typically measure drag reduction in pipe sizes less than 1 inch, whereas in field applications fluid is flowing through pipes with a diameter typically around 4 or 5 inches. Flow in laboratory equipment or flow loops is typically around 10-20, or 30 gallons per minute, whereas in field applications it can be 60-120 or 100-150 barrels per minute or higher. Laboratory equipment or flow loops also do not mimic other field conditions as well (e.g., pipe wall roughness). This generally results in a range of Reynolds number produced in the laboratory being much lower (e.g., between 50,000-200,000) compared to those observed in the field (e.g., between 1,500,000-3,000,000).

Figure 2:
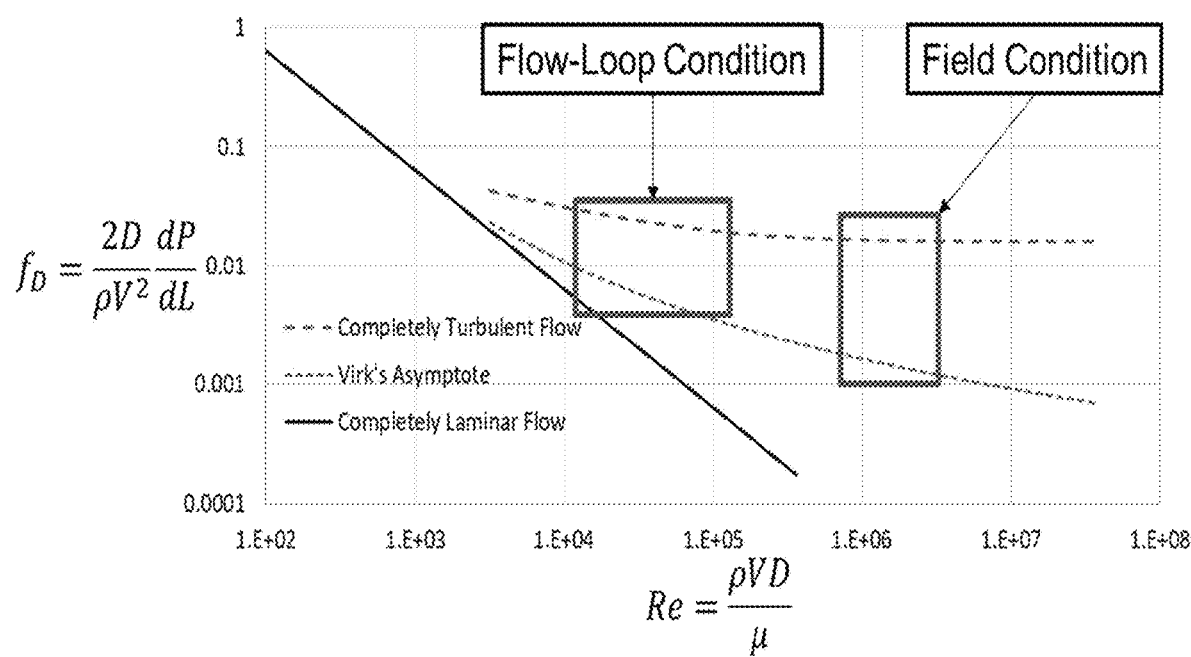
FIG. 2 is a Moody diagram illustrating example flow-loop testing conditions and field conditions.

FIG. 2 is a Moody diagram illustrating example flow-loop testing conditions and field conditions. As shown, the resulting friction factors observed in the laboratory or flow loops are different than those in field applications. Accordingly, current practices of using a Moody diagram to upscale laboratory or flow loop data to predict field performance is not as precise as needed.

Figure 3:
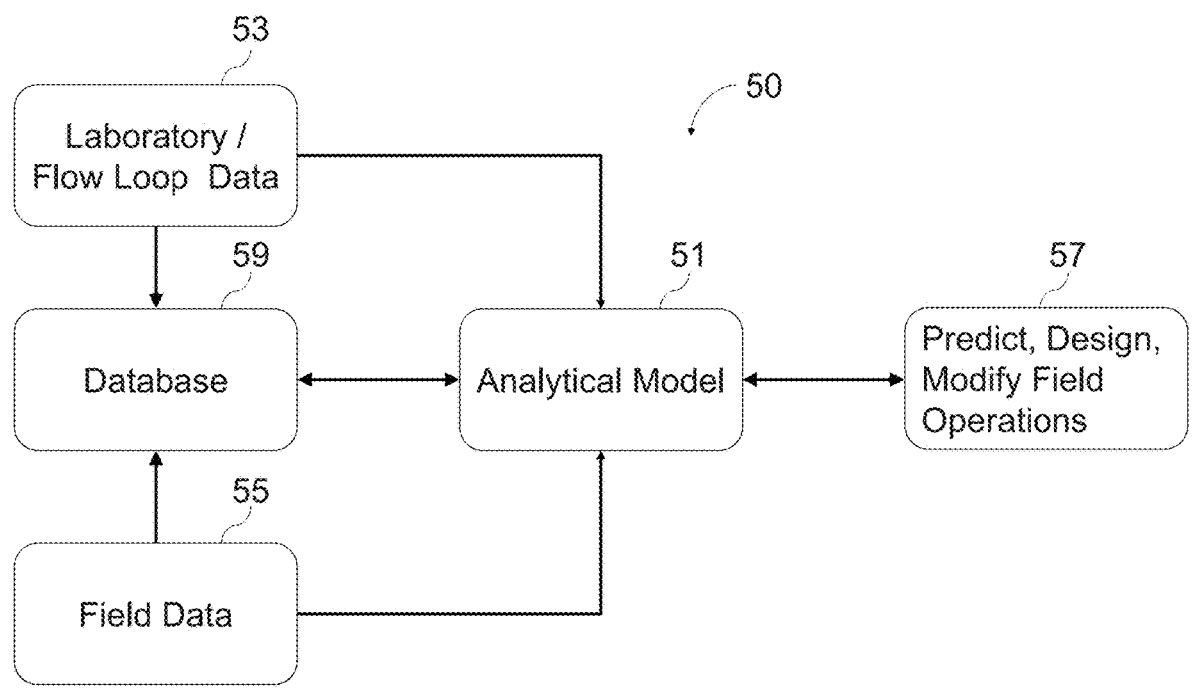
FIG. 3 illustrates an example embodiment for upscaling drag reduction data for a variety of field applications.

FIG. 3 illustrates process 50 for upscaling drag reduction data for a variety of field applications according to an embodiment of the invention. In step 51, an analytical model is generated to upscale laboratory data or small-scale flow data from a fluid comprising a drag reducing agent a to predict performance of the fluid under field conditions. The analytical model derives a velocity profile of flow in pipes and determines the fluid velocity (V) versus the pressure gradient (dP/dL). In embodiments, parameters accounted for in the analytical model include pipe diameter, pipe wall roughness, wall shear rate/stress, fluid viscosity, fluid density, fluid velocity, fluid temperature, fluid salinity, a concentration of drag reducing agent within the fluid and associated properties of the drag reducing agent (e.g., relaxation time, molecular weight), or any combination thereof.

In step 53, laboratory or flow loop data is measured to populate or calibrate analytical model 51. In embodiments, this data is measured using portable apparatus 10 previously described. In some embodiments, laboratory or flow loop data 53 comprises yard-scale flow loop data (i.e., measurements using larger sized equipment such as 2-3 inch diameter piping). Fluid can be measured at various concentrations of drag reducing agent. For example, initially a fluid (e.g., water plus other chemicals to be injected in the subterranean reservoir) can be measured at a range of flow rates between 2 and 30 gallons per minute (e.g., in increments of 2 gallons per minute each for 15 to 60 seconds). The drag reducing agent can then be added for a range of concentrations between 0.1 to 5 gallons of drag reducing agent per thousand gallons of fluid (e.g., at concentrations 0.1, 0.25, 0.5, 0.75, 1.0, 1.5, 2.0, 2.5, 3.0 3.5, 4.0, 4.5, and 5 gpt) and for each concentration a pressure drop can be recorded as the flow rate is altered (e.g., increased, decreased, or both). Typically, the pressure drop reaches steady state for a change in flow rate within 60 seconds (e.g., 15-30 seconds). Note that at higher flow rates the flow duration should be closely monitored to ensure degradation of the drag reducing agent is limited while still acquiring steady state pressure drops.

Once the analytical model 51 is populated or conditioned with the laboratory or flow loop data, it can then be used to upscale the drag reduction percentage and applied to predict, design and/or modify field operations 57 to enhance field performance. Field data 55 can further be used to validate analytical model 51, as well as, guide testing to obtain additional laboratory or flow loop data 53. Field data 55 can comprise measurements or estimates of drag reduction based on wellhead pressure, bottom hole pressures, estimated hydrostatic pressure, perforation pressure friction loss, tubing pressure differentials, tubing or pipe lengths, flow rates, or any combination thereof. Analytical model 51 can then be used to predict, design and/or modify field operations 57 to enhance field performance.

Process 50 can additionally include database 59 to store properties of drag reducing agents (e.g., relaxation time, drag reduction parameters, molecular weight) obtained from laboratory or flow loop data 53, field data 55, or any combination thereof. Information contained in database 59 can be used by analytical model 51 to predict, design and/or modify field operations 57 to enhance field performance. In particular, storing properties of drag reducing agents in database 59 can help reduce the need for future testing of fluids comprising a drag reducing agent as this information can be utilized as an alternative to, or in addition to, new laboratory or flow loop data 53, field data 55, or any combination thereof.

In one embodiment, a process comprises first preparing a fluid mixture and pumping the fluid mixture through a wellbore into a formation. The specific composition of the fluid mixture will vary depending upon, for example, the well characteristics and/or desired results. In some embodiments the fluid mixture comprises a concentration of a drag reducing agent. Of course, the concentration and the specific drag reducing agent may vary depending upon the desired results and other parameters. In some embodiments the drag reducing agent is selected from agents which have a $\Delta B_{max}$ in said formation of from about 10, or from about 15, or from about 20, or from about 25, or from about 40, or from about 45, or from about 50 up to about 70, or up to about 65, or up to about 60, or up to about 55, or up to about 50, or up to about 30 during at least a portion of the process. Representative useful processes include, for example, hydraulic fracturing, injecting fluid, produced water, transportation of water for reinjection, pipelining fluids in turbulent flow conditions, and/or disposal well processes. As the ordinary skilled artisan appreciates such representative processes alone or any combination thereof may be referred to generally as an oil field operation or a pipeline operation.

In another embodiment, the present application relates to a process useful in oil and gas industry such as hydraulic fracturing an oil or gas formation. Such processes first typically comprise obtaining data on one or more potential drag reducing agents by conducting flow loop testing. Next, upscaling is conducted using obtained flow loop data on the one or more potential drag reducing agents to obtain predicted drag reduction of the one or more potential drag reducing agents in a process such as hydraulic fracturing. A drag reducing agent and a concentration of the drag reducing agent based at least in part on the predicted drag reduction can be selected, and the selected process (e.g., hydraulically fracturing) may be conducted using the selected concentration of the selected drag reducing agent. That is, in the case of hydraulically fracturing, one may pump a fluid mixture comprising the selected concentration of the selected drag reducing agent through a wellbore into the formation.

Obtaining predicted drag reduction comprises using one or more parameters selected from the group consisting of polymer relaxation time, shear rate, polymer drag reduction parameter $\Delta B$, pipe diameter, flow rate, pipe roughness, shear stress on pipe, or any combination thereof. In some embodiments, one may obtain or measure actual drag reduction during hydraulic fracturing and use it advantageously. For example, predicted drag reduction of the selected drag reducing agent and selected concentration of the drag reducing agent may be compared with actual or measured drag reduction to calibrate the upscaling parameters and models.

In other embodiments, viscosity of the one or more potential drag reducing agents may be measured prior to conducting flow loop testing and then viscosity can be measured again subsequent to conducting flow loop testing. An understanding of the differences may be favorably employed in upscaling.

In another embodiment, the application pertains to a process to determine drag resistance. The process typically comprises obtaining data on viscosity as a function of shear rate, drag reduction percentage as a function of velocity, or both for a plurality of drag reducing agents. Preferably, the data is obtained on at least one diameter or preferably a plurality of diameters of conduit. Such conduit may be any shape but it typically substantially cylindrical such as a tubing or a pipe.

Data may be obtained on at least one concentration, however, a plurality of concentrations may be preferable depending upon the specific drag reducing agent or agents and other parameters employed. In embodiments, data can be obtained for concentrations drag reducing agent of approximately 0.1 gallons per one thousand gallons of water (0.1 gpt), approximately 0.25 gallons per one thousand gallons of water (0.25 gpt), approximately 0.5 gallons per one thousand gallons of water (0.5 gpt), approximately 0.75 gallons per one thousand gallons of water (0.75 gpt), approximately 1 gallons per one thousand gallons of water (1.0 gpt), approximately 1.5 gallons per one thousand gallons of water (1.5 gpt), approximately 2 gallons per one thousand gallons of water (2 gpt), approximately 5 gallons per one thousand gallons of water (5 gpt), or any combination thereof.

Data may be obtained on at least one flow rate, however, a plurality of flow rates may be preferable depending upon the specific drag reducing agent or agents and other parameters employed. In embodiments, data can be obtained for flow rates of approximately 2 gallons per minute, approximately 3 gallons per minute, approximately 4 gallons per minute, approximately 5 gallons per minute, approximately 7 gallons per minute, approximately 9 gallons per minute, approximately 11 gallons per minute, approximately 13 gallons per minute, approximately 15 gallons per minute, approximately 20 gallons per minute, approximately 25 gallons per minute, approximately 30 gallons per minute, or any combination thereof. Generally, flow rates are tested for a time period in order for a pressure drop to reach steady state. Flow duration at higher flow rates should be minimized to limit mechanical polymer degradation while still acquiring steady state pressure drop recordings.

The drag reduction of the plurality of drag reducing agents may then be estimated. Typically, estimating uses parameters such as polymer drag reduction parameter $\Delta B$, shear rate, and polymer relaxation time. If desired, the estimates may be stored in an analytical model which advantageously may be used in the future as estimates and actual field data are accumulated. In this manner the analytical model may even be more accurate in the future. That is, estimated drag reduction of the plurality of drag reducing agents may be compared with actual drag reduction if desired. In this manner the estimated drag reduction(s) in the analytical model may be modified based on the actual drag reductions.

In some embodiments, the process may comprise hydraulically fracturing a well using estimated drag reduction or modified estimated drag reduction to select a drag reducing agent, a concentration of drag reducing agent, or both. For example, the concentration of drag reducing agent may be modified (e.g., increased or decreased) in slickwater pumping stages or linear gel pumping stages to maximize recovery performance. Information may be advantageous for a number of additional reasons including, for example, so that a selection may be to reduce required horsepower or energy during hydraulically fracturing. Alternatively, or additionally the process could be used to design a well or completion (e.g., determine length of lateral, casing size) or enhance operation performance such that if fracturing is required, then it will be of less cost, more efficient, more productive, and/or provide other advantages to the designed well. The pumping schedule and design for a hydraulic fracturing operation could also be modified (e.g., pumping rate, perforation design, number of pumps).

The specific drag reducing agent or agents employed are not particularly limited and may include, for example, a polymer, a fiber, a surfactant (e.g., a higher molecular weight surfactant), a booster such as a solvent, or any combination thereof.

Specific Embodiments

While the aforementioned upscaling processes for drag reduction agents may be accomplished in a number of ways, the specifics of a representative process are described below.

One may first make a solution with a specific concentration of drag reduction agents. Such a solution may be brine with any salinity and may include other chemicals such as surfactants, scale inhibitors, biocide, corrosion inhibitors. One then measures viscosity versus shear rate on the solution using, for example, a rheometer. This can be plotted as viscosity (e.g., units in centipoise: cP) on the Y-axis versus shear rate (e.g., units in reciprocal seconds: 1/sec) on the X-axis.

Figure 4:
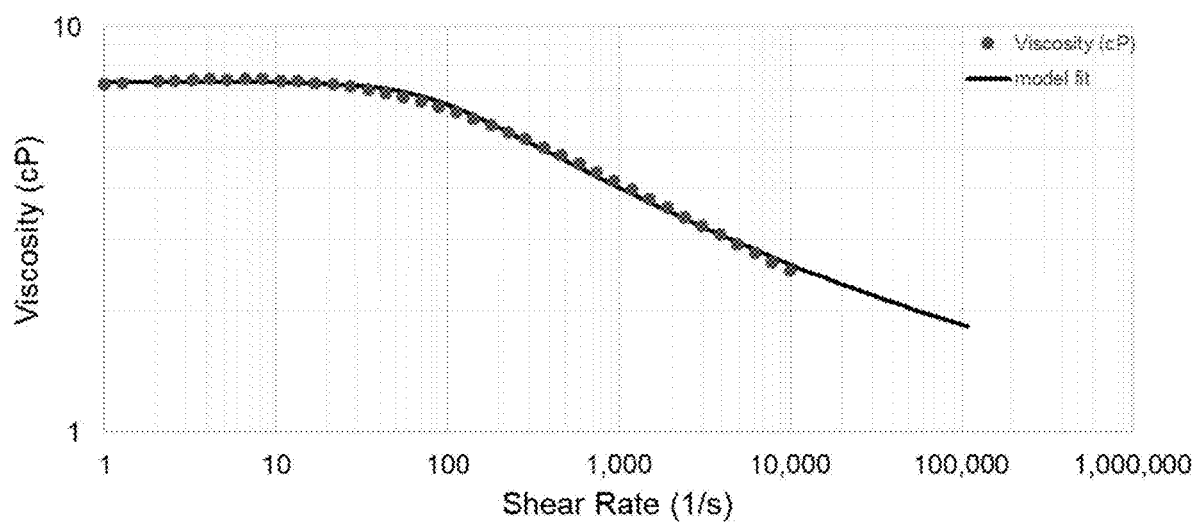
FIG. 4 is a plot displaying viscosity compared to shear rate for an example drag reducing agent.

FIG. 4 shows an example of a viscosity versus shear rate plot. In FIG. 4, measurements were taken at room temperature using a double-wall couette style rheometer. The sample contains a concentration of one gallon of drag reducing agent per 1000 gallons of tap water (i.e., 1 gpt). The circles represent the measured points and the line represents a corresponding viscosity model that illustrates an approximate fit of the data. The following equation (Carreau-Yasuda) can be used to model viscosity as function of shear rate:

$$\eta = \eta_\infty + (\eta_0 - \eta_\infty)[1 + (\dot{\gamma}\lambda)^2]^{(n-1)/2}$$

where $\eta$ represents dynamic or shear viscosity such that $\eta_0$ is the zero shear viscosity and $\eta_\infty$ is the infinite shear viscosity, $\dot{\gamma}$ represents shear rate, $\lambda$ represents relaxation time, and n is a power law index. The relaxation time from Carreau-Yasuda is a fitting parameter and may not represent the physical properties of the polymer solution. Relaxation time can be measured using a rheometer by a person trained in the art. For such lower concentration of friction reducers, specialized Rheometers such as a micro-rheometer or extensional Rheometer may be utilized to obtain accurate relaxation time and viscosity vs shear rate data. Alternatively, analytical models can be utilized to estimate extensional or Zimm relaxation time and viscosity vs shear rate data for lower concentrations of friction reducers from viscosity measurements at high concentrations using conventional rheometers. Useful information about analytical models may be found in, for example, in Jouenne et al. *Conference Proceedings, IOR* 2019-20th European Symposium on Improved Oil Recovery, April 2019, Volume 2019, p. 1-23 (2019) (https://doi.org/10.3997/2214-4609.201900140) which is incorporated herein by reference and was modified to show relaxation time dependency on concentration below c/c*<1 where c is polymer concentration and c* is critical polymer concentration equal to inverse of intrinsic viscosity. As used herein the shear rate $\dot{\gamma}$ multiplied by the relaxation time $\lambda$ is the Weissenberg number (We or Wi), which is a dimensionless number that compares elastic to viscous forces.

The equation to model viscosity as function of shear rate can be transformed to shear stress versus shear rate as follows:

$$\tau_w = \eta_w \dot{\gamma}_w$$

$$\tau_w = \eta_\infty \dot{\gamma}_w + (\eta_0 - \eta_\infty)\dot{\gamma}_w[1 + (\dot{\gamma}_w\lambda)^2]^{(n-1)/2}$$

where $\tau_w$ represents shear stress at the wall of the pipe.

Pressure drop in a pipe is generally a function of shear stress. Shear rate at the wall can be calculated for any flow rate in a pipe using the above equation with measured viscosity versus shear rate data.

$$\Delta p = \frac{4l\tau_w}{D}$$

Using a flow-loop (e.g., 1 or more tube diameters), one can measure flow rate versus pressure drop for a wide range of flow rates. This is generally done quickly by switching to a new flow rate when the pressure stabilizes. Pressure drop can be converted to a drag reduction percentage (DR %) using the equation below.

$$DR\% = \frac{dP_{water} - dP_{FR}}{dP_{water}} * 100\%$$

Drag reduction percentage (DR %) can then be plotted on the Y-axis with flow rate (e.g., gallons per minute) on X-axis using the measured pressure drop data.

Figure 5:
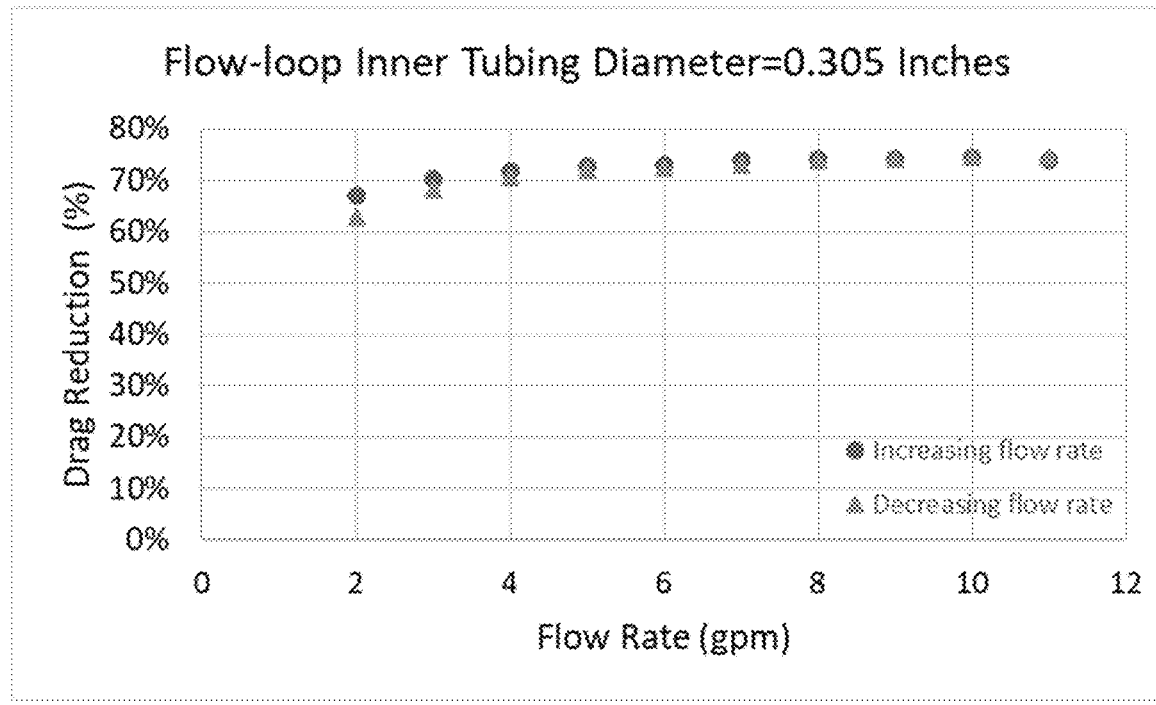
FIG. 5 is a plot displaying drag reduction percentages for an example drag reducing agent, friction reducer A, flowing through a 0.305 inch diameter pipe at a range of flow rates.
Figure 6:
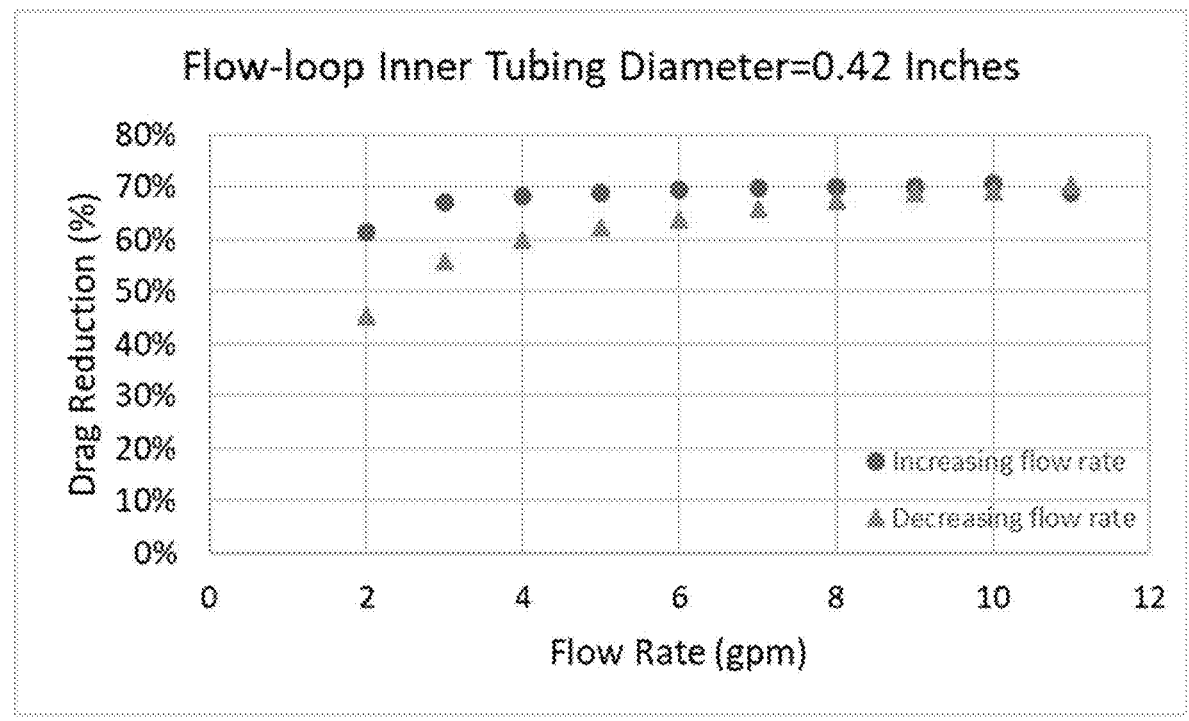
FIG. 6 is a plot displaying drag reduction percentages for an example drag reducing agent, friction reducer A, flowing through a 0.425 inch diameter pipe at a range of flow rates.
Figure 7:
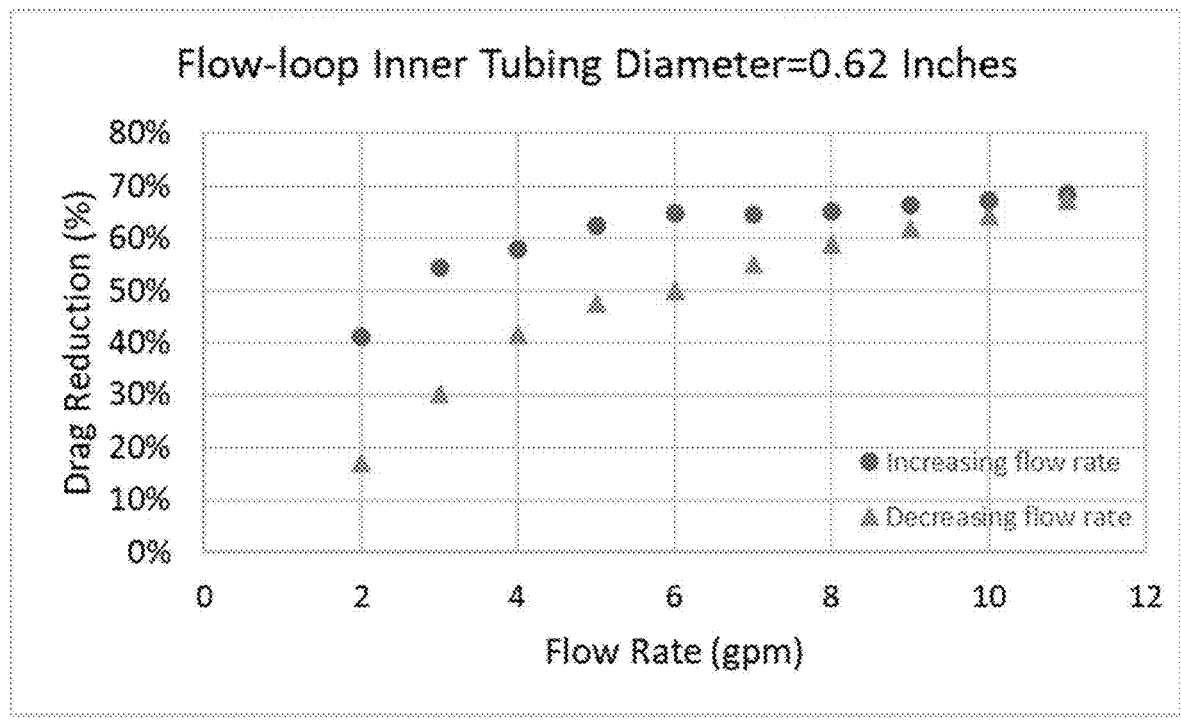
FIG. 7 is a plot displaying drag reduction percentages for an example drag reducing agent, friction reducer A, flowing through a 0.62 inch diameter pipe at a range of flow rates.

FIGS. 5-7 show plots where a fluid concentration of one gallon of drag reducing agent A per one thousand gallons of water (1 gpt) that was run through a flow loop comprising three different piping sizes. In each plot, an initial flow rate of 2 gallons per minute (gpm) was increased to 11 gallons per minute in increments, and then decreased in increments back to 2 gallons per minute. In particular, FIG. 5 illustrates results using a 0.305 inch diameter pipe, FIG. 6 illustrates results using a 0.425 inch diameter pipe, and FIG. 7 illustrates results using a 0.62 inch diameter pipe.

Figure 8:
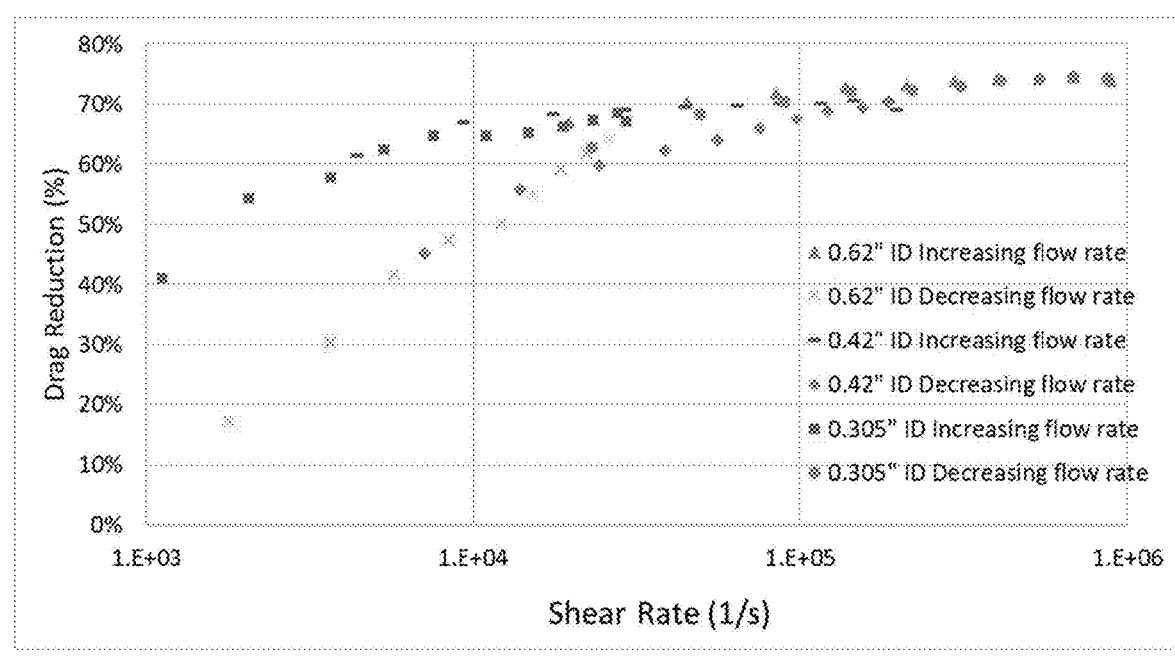
FIG. 8 is a plot displaying the drag reduction percentages for the example drag reducing agent, friction reducer A, shown in FIGS. 5 through 7 compared to shear rate.

Drag reduction percentage (DR %) can also be plotted compared to shear rate (1/s) as shown in FIG. 8. Here, the flow rate (Q) is modified to shear rate using the viscosity versus shear rate equation above, i.e., $$\tau_w = \eta_w \dot{\gamma}_w$$

$$\tau_w = \eta_\infty \dot{\gamma}_w + (\eta_0 - \eta_\infty)\dot{\gamma}_w[1+(\dot{\gamma}_w \lambda)^2]^{(n-1)/2}$$

Accordingly, the results using the flow loop experiment using the various pipe diameters shown in FIGS. 5-7 are now plotted in single FIG. 8 where the X-axis was modified to shear rate instead of flow rate.

Figure 9:
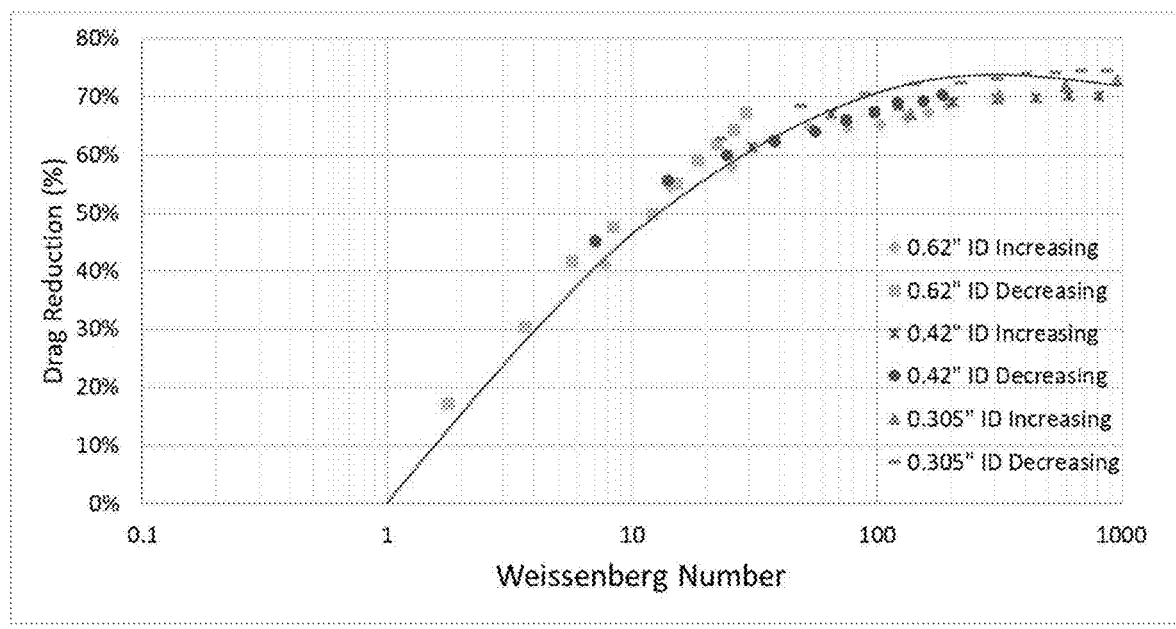
FIG. 9 is a plot displaying the drag reduction percentages for the example drag reducing agent, friction reducer A, shown in FIGS. 5 through 7 compared to a range of Weissenberg numbers.

FIG. 9 further illustrates the above results using the Weissenberg number (We or Wi), where the shear rate is multiplied with relaxation time. This transforms the data from the three individual pipe sizes into a dimensionless number, thus collapsing all of the data into a single curve where drag reduction percentage (DR %) is on the Y-axis and Weissenberg number (We or Wi) is on the X-axis. In some embodiments, relaxation time is measured using a rheometer. In another embodiment, the criteria that when We<1, DR %=0 and when We>1, DR % increases until a plateau is reached may be used.

Figure 10:
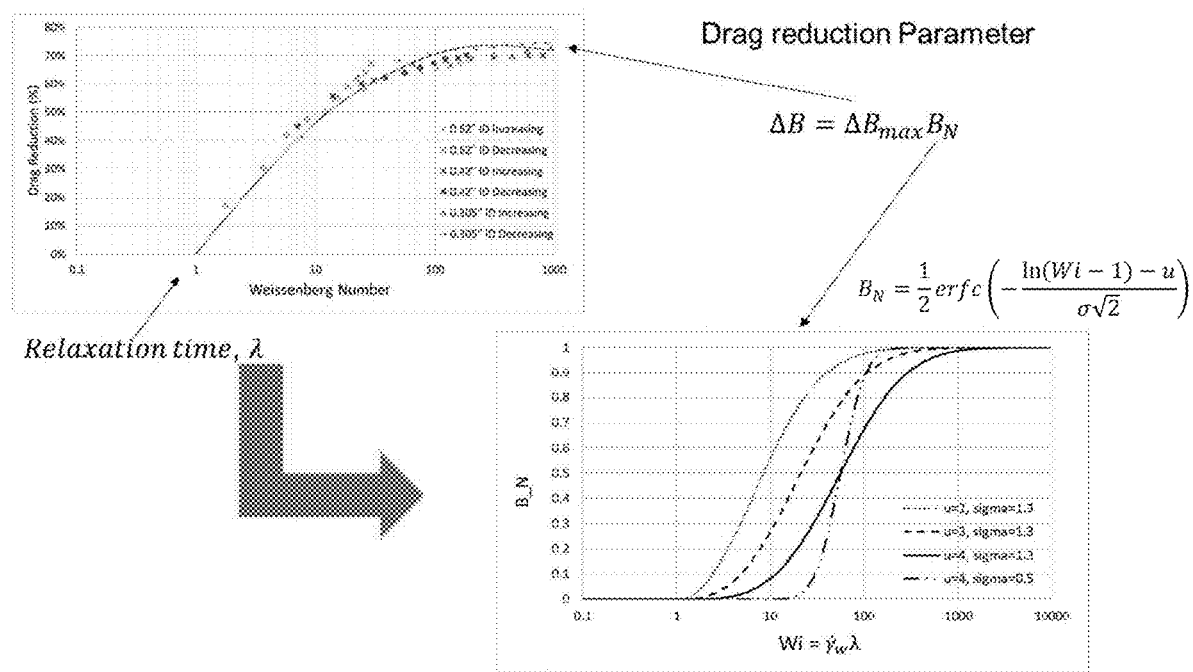
FIG. 10 illustrates the relationship between drag reduction parameter and relaxation time.
Figure 18A:
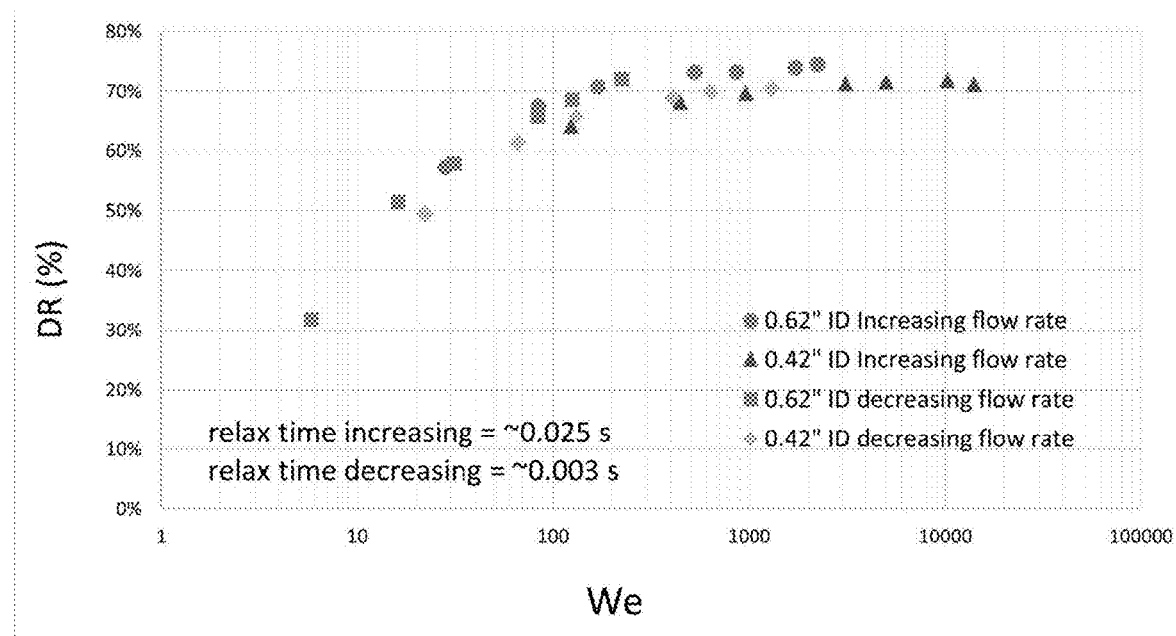
FIG. 18a shows DR % vs Wi for 0.5 gpt friction reducer B.
Figure 18B:
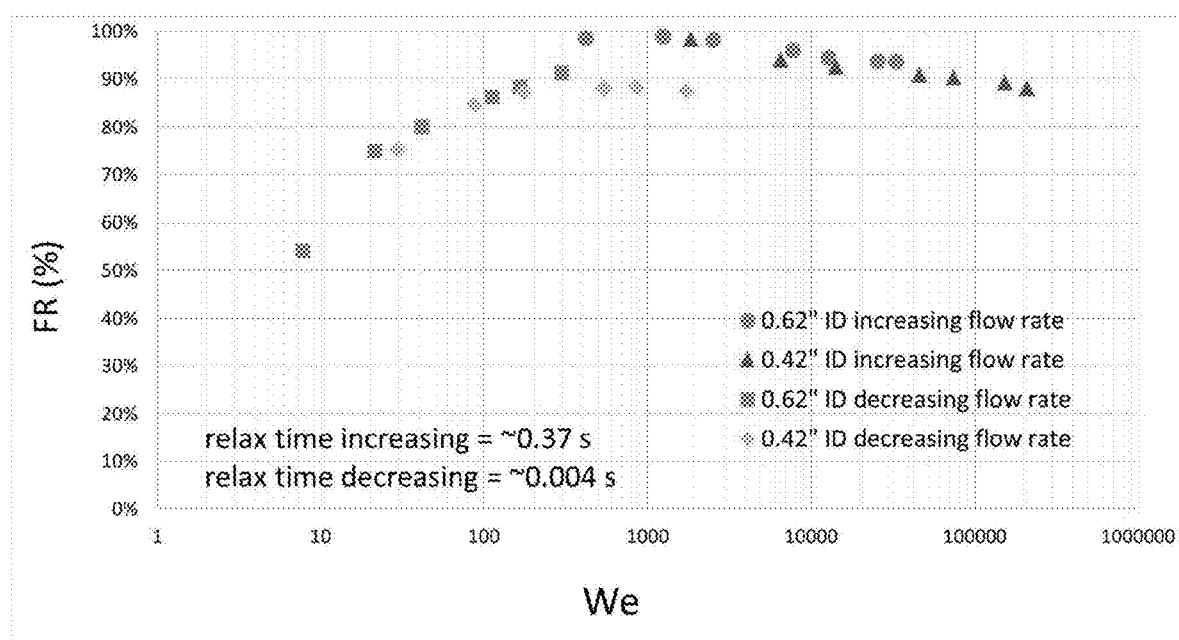
FIG. 18b shows FR % vs Wi for 0.5 gpt friction reducer B.

In order to obtain the plot in FIG. 9 an additional parameter referred to herein as drag reduction parameter ($\Delta B$) is utilized. The following equations can be utilized for determining the drag reduction parameter:

$$\Delta B = \Delta B_{max} B_N$$

$$B_N = 0 \text{ for } Wi \leq 1$$

$$B_N = CDF \text{ for } 0 < B_N \leq 1$$

where $\Delta B_{max}$ is the maximum drag reduction at Wi>>1, $B_N$ is the normalized drag reduction as a function of shear, $Wi = \dot{\gamma}_w \lambda$ is Weissenberg number, $\dot{\gamma}_w$ is the wall shear rate, $\lambda$ is the longest relaxation time, and CDF is a cumulative distribution function. An example of CDF utilized is log-normal distribution function, $$B_N = \frac{1}{2}\text{erfc}\left(-\frac{\ln(Wi-1)-u}{\sigma\sqrt{2}}\right),$$

where u is mean and $\sigma$ standard deviation. FIG. 10 illustrates how $\Delta B_{max}$, the relaxation time, and the shape of $\Delta B$ can be identified for a fluid having a concentration of 1 gallon of drag reducing agent per one thousand gallons of water that match the shape of DR % vs Wi. This establishes the relationship between DR % and $B_N$. Useful information may be found in, for example, Owolabi et al. "Turbulent Drag reduction by polymer additives in parallel shear flows, *Journal of Fluid Mechanics*, Vol. 827, (2017) (https://doi.org/10.1017/jfm.2017.544) which is incorporated herein by reference. It was discovered that plotting DR % vs Wi are accurate for friction reducers with lower relaxation number but that friction reducers with higher relaxation time that are useful for oil and gas industry (example of hydraulic fracturing) generally cannot be accurately described by DR % vs Wi relationship. While not wishing to be bound to any particular theory it is believed that DR % is also a function of Reynolds number as well as Wi especially with friction reducers with higher relaxation time. A robust plot that eliminates the effect of Reynolds number on DR % is illustrated in FIG. 18a for friction reducer B in relatively fresh water. This method utilizes the following equation for friction reduction % and allows for better estimation of relaxation time, $\Delta B_{max}$ and CDF compared to DR % vs Wi.

$$FR\% = \frac{f_{water} - f_{FR}}{f_{water} - f_{Virk}} * 100\%$$

Where $f_{water}$ is friction factor of water, $f_{FR}$ is friction factor of friction reducer, and $f_{Virk}$ is friction factor of Virk's asymptote and all are at the same Reynolds number. FIG. 18a shows DR % vs Wi and FIG. 18b shows FR % vs Wi for 0.5 gpt friction reducer B. FIGS. 18a and 18b show that for decreasing flow rate data with lower relaxation number, FR % vs DR % gives relatively similar results but increasing flow rate data shows vastly different relaxation time. FR % plot also shows different peak FR % values for increasing and decreasing flow rate data. This split indicates performance degradation which is modeled as $\Delta B_{max}$. This performance degradation could be due to mechanical degradation of friction reducer in flow-loop due to multi-pass flow. FR % vs Wi should be plotted for a robust and accurate analysis for a wide range of friction reducers properties.

Once $\Delta B$ and relaxation time are known, flow rates for imposed pressure gradients can be estimated for turbulent flow in a pipe by deriving the velocity profile of fluid. In the literature, the velocity profile of turbulent flow in a pipe has been measured and derived for water and water with drag reducing agents. The profile comprises three layers: a viscous sublayer near the wall, a buffer layer, and a log-law layer. It has been demonstrated that drag reducing agents function by increasing the buffer layer thickness, and $\Delta B$ from FIG. 10 is used to estimate the thickness of the buffer layer for various pipe sizes and flow rates. A detailed background on turbulent flow velocity profiles in pipes can be found in a scientific paper by P. S. Virk. (*Drag Reduction Fundamentals*, AIChE Journal, Volume 21, Issue 4, Pages 625-656, July 1975) which is incorporated herein by reference.

Figure 11A:
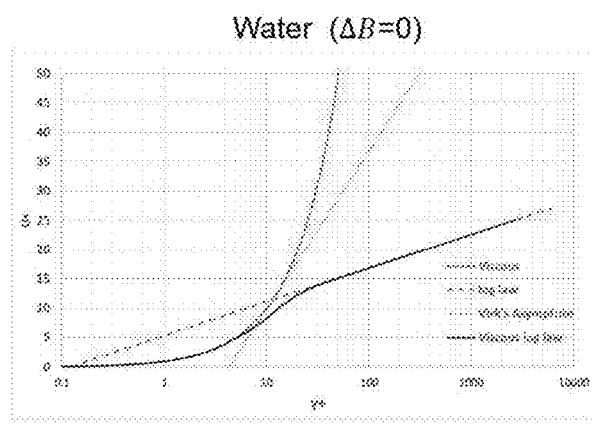
FIG. 11A illustrates velocity profiles for water and FIG. 11B illustrates water with a drag reducing agent.
Figure 11B:
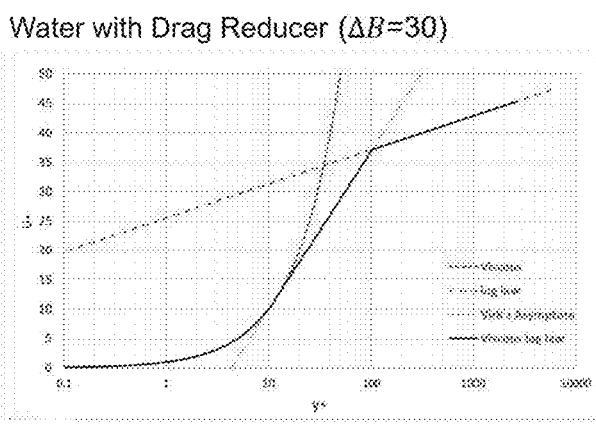

FIGS. 11A and 11B illustrate how the buffer layer thickness increases with the addition of a drag reducing agent. In particular, FIG. 11A plots the viscous sublayer near the wall and a log-law layer layers for a fluid without a drag reducing agent ($\Delta B = 0$) and FIG. 11B plots these layers for a fluid with a drag reducing agent ($\Delta B = 30$). In both plots, the dashed lines represent a viscous sublayer near the wall, Virk's Asymptote, and a log-law layer. The solid lines represents the updated curve taking this combination into account.

Figure 12:
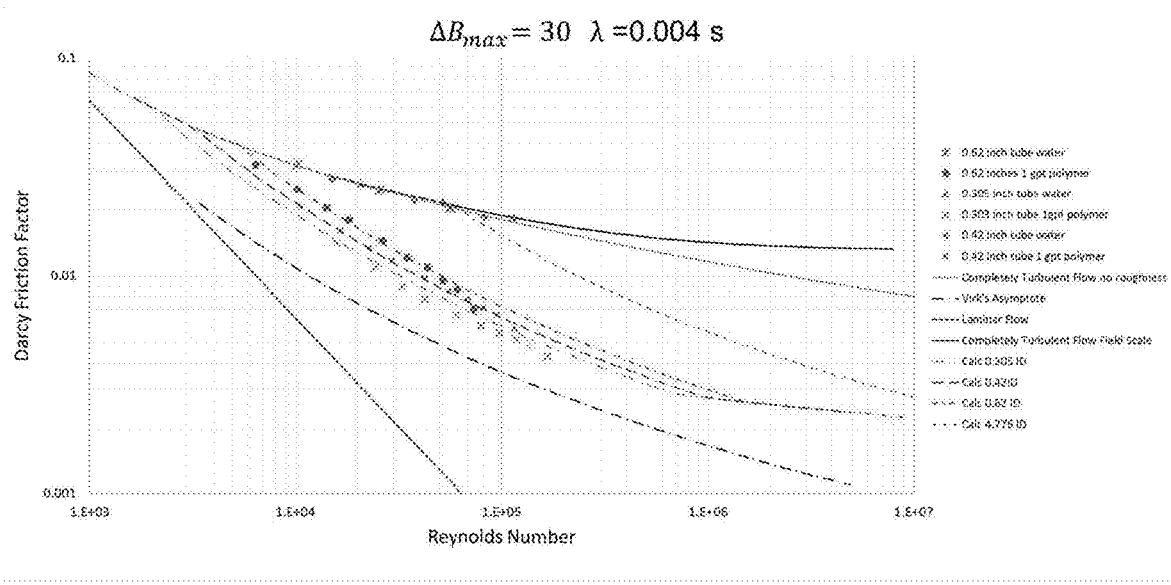
FIG. 12 is a Moody diagram illustrating the example drag reducing agent, friction reducer A, shown in FIGS. 5 through 7 compared to calculated fits using example reduction parameters and relaxation times.

FIG. 12 illustrates an example of measured data from three pipe sizes on a Moody plot. The solid lines represent approximate fits to the measured data using a value of one for the maximum drag reduction and relaxation time (i.e., $\Delta B_{max} = 1$ and $\lambda = 1$ s). Here the drag reduction percentage versus flow rate plot measured using a flow-loop was transformed into a non-dimensional Moody plot wherein the Darcy Friction Factor is plotted on the Y-axis and the Reynolds number is plotted on the X-axis.

$$\text{Friction Factor} = \frac{2D}{\rho V^2}\frac{dP}{dL}$$

$$\text{Reynolds Number} = \frac{\rho VD}{\mu}$$

In particular, FIG. 12 utilizes the analytical model and the relaxation time from the preceding step and adjusts the maximum drag reduction until data from the three pipe sizes matches the approximate fit. In this case, a value of one for the maximum drag reduction and relaxation time (i.e., $\Delta B_{max}=1$ and $\lambda=1$) arrive at approximate fits for the data from each pipe size. Note that the model results in three different curves due to three different diameters of the pipes used in the flow loop.

Once maximum drag reduction and relaxation times are tuned based on the measured flow loop data, the model can be used to upscale to estimate Darcy Friction Factor vs. Reynolds number for any pipe diameter. When a Darcy Friction Factor versus Reynolds number curve is generated, using the equation $$\text{Friction Factor} = \frac{2D}{\rho V^2}\frac{dP}{dL},$$

then a pressure drop versus flow rate table can be estimated.

Figure 13:
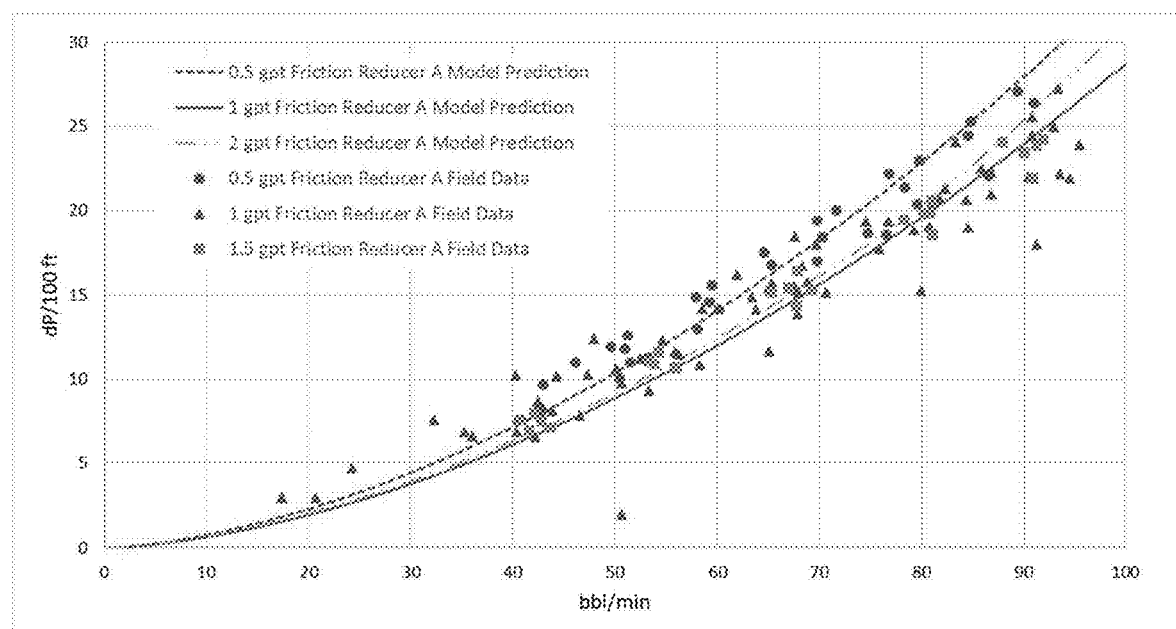
FIG. 13 illustrates estimated pressure drop compared to flow rate for an example drag reducing agent for a field scale hydraulic fracturing operation along with corresponding measured field data.

FIG. 13 is a plot of estimated pressure drop versus flow rate for a field scale hydraulic fracturing operation compared with measured field data. In particular, flow-loop data for three fluids having a concentration of drag reducing agent ranging from 0.5-1.5 gpt was used to tune the model for the estimated values. The field casing pressure drop versus flow rate data was estimated by performing a step-down test and monitoring the wellhead pressure. No downhole gauge was available and known methods were utilized to decouple casing pressure drop from perforation pressure drop and near-wellbore pressure drop. The results appear to estimate the field observed pressure drop data well based on measured laboratory flow-loop data.

The preceding steps can be repeated for various concentrations of drag reducing agents. And if one desired to evaluate two or more drag reducing agents, then the preceding steps may be repeated for each drag reducing agent or call of agents being considered.

Figure 14:
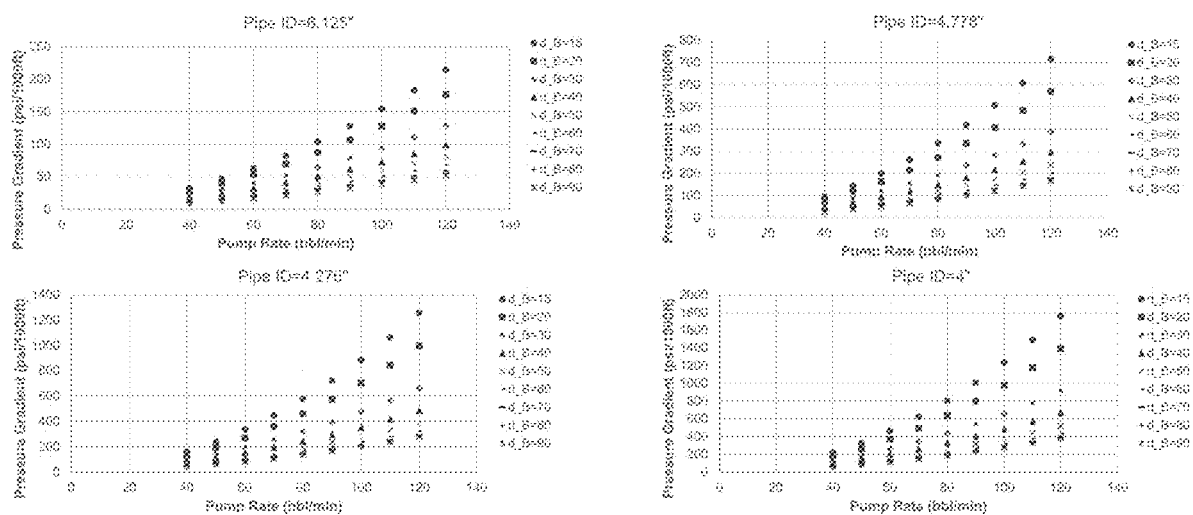
FIGS. 14 and 15 show plots of field pressure gradient compared to flow rate for polymer relaxation times and ranges of polymer drag reduction parameter ΔB values.
Figure 15:
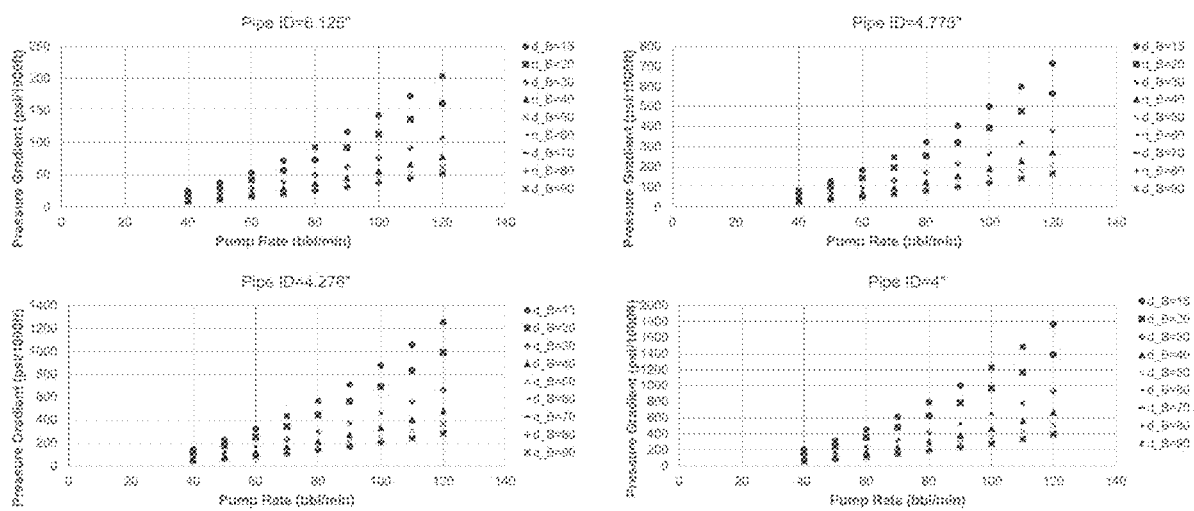

FIGS. 14 and 15 show plots of field pressure gradient compared to flow rate for polymer relaxation times and ranges of polymer drag reduction parameter $\Delta B$ values. It can be observed from these diagrams that as the $\Delta B$ value increases that after a certain quantity the pressure gradient for a particular pump rate no longer changes. For example, in FIG. 14, for a pipe ID of 6.125 inches and a relaxation time of 0.0005 seconds, the $\Delta B$ values after about 60 or 70 appear to be approximately equivalent. Accordingly, adding additional drag reducing agent to the fluid being injected in the field to increase the $\Delta B$ value after it reaches a value of about 60 or 70 appears to have no benefit. For comparison, if the relaxation time is increased to 0.02 seconds as shown in FIG. 15 for a pipe ID of 6.125 inches, the $\Delta B$ values after about 50 or 60 appear to be approximately equivalent (i.e., less drag reducing agent is needed compared to the drag reducing agent with a relaxation time of 0.0005 seconds). Therefore, the amount or type of drag reducing agent can be modified or optimized for field application using $\Delta B$ values.

Figure 16:
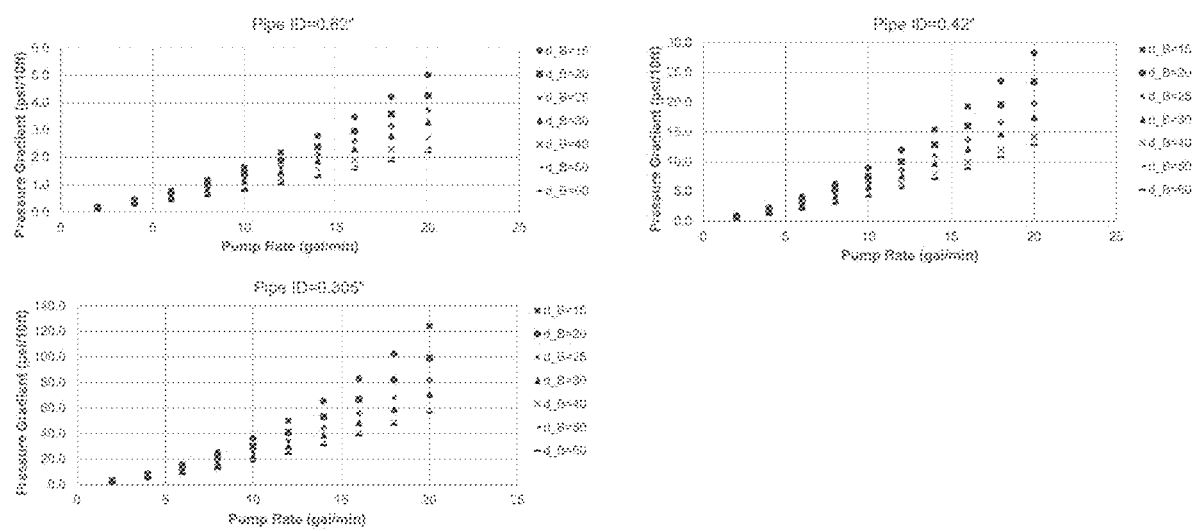
FIGS. 16 and 17 show plots of laboratory pressure gradient compared to flow rate for polymer relaxation times and ranges of polymer drag reduction parameter ΔB values.
Figure 17:
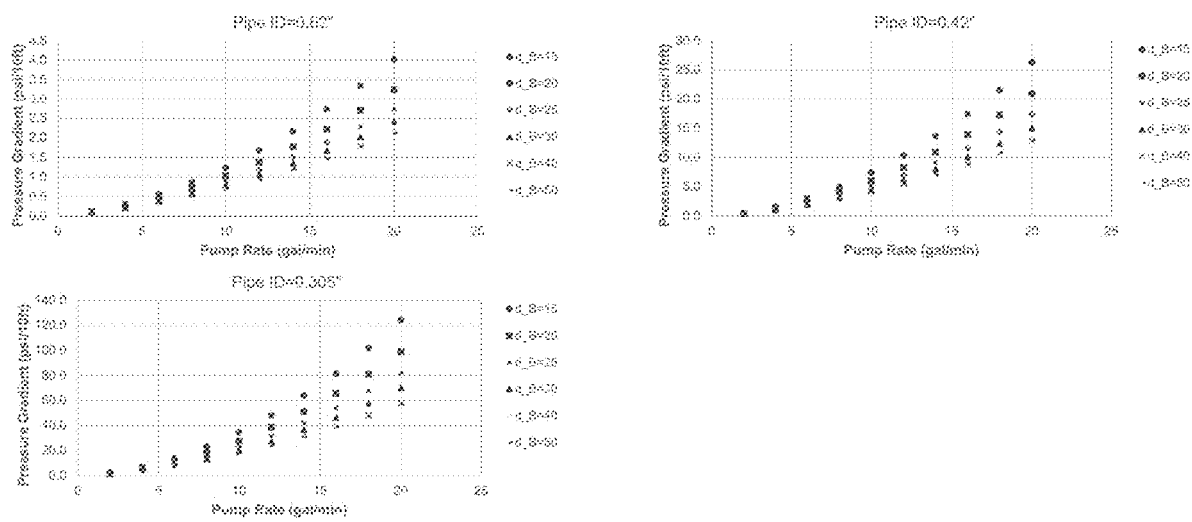

FIGS. 16 and 17 show corresponding plots of laboratory pressure gradient compared to flow rate for polymer relaxation times and ranges of polymer drag reduction parameter $\Delta B$ values. Here it is observed that under laboratory or flow loop conditions, $\Delta B$ values tend to reach an optimum value that is lower than those observed under field conditions (i.e., for the same pipe diameter and relaxation time the $\Delta B$ value needed to achieve maximum drag reduction is lower). Similar to FIGS. 14 and 15, $\Delta B$ values observed in the lab can be plotted to modify or optimize the amount or type of drag reducing agent for a field application.

The table below shows the analytical model fit parameters of a range of partially hydrolyzed polyacrylamide friction reducer solutions that were tested utilizing the flow-loop procedure outlined in this patent. The properties tested were 20-300 ppm polymer concentration, 0.1-12% TDS brines, and a range of polymer molecular weights.

The key for friction reducer/polymer table describes estimated molecular weight of partially hydrolyzed polyacrylamide polymers utilized. Low describes FRs with average MW of from about 0.5 MDa to about 5 MDa. Mid describes FRs with average molecular weight between about 5 to about 15 MDa. High describes FRs with average molecular weight of from about 15 MDa to about 30 MDa. A Mid-High polymer is one that is on the upper end of the Mid range and lower end of the High range.

| Key for friction Reducer/Polymer Table | |
|---|---|
| Polymer | MW ranges |
| Friction Reducer A or Polymer A | Low |
| Friction Reducer B or Polymer B | Low |
| Friction Reducer C or Polymer C | Mid |
| Friction Reducer D or Polymer D | High |
| Friction Reducer E or Polymer E | Mid-High |
| Friction Reducer F or Polymer F | Mid |
| Friction Reducer G or Polymer G | High |

Polymer type Polymer A
relax time at 0.094
C[n] = 1
Salinity 0.10%

| Conc. (ppm) | LHL | dB_max | relaxation time | u | std dev | C[n] |
|---|---|---|---|---|---|---|
| 300 | LH | 26 | 0.146 | 2.5 | 1.5 | 2.98 |
| 150 | | 26 | 0.104 | 2.5 | 1.5 | 1.49 |
| 75 | | 23 | 0.04 | 6 | 1.5 | 0.75 |

Polymer type Polymer B
relax time at 0.0187
C[n] = 1
Salinity 1% TDS

| Conc. (ppm) | LHL | dB_max | relaxation time (s) | mean, u | std dev, σ | C[n] |
|---|---|---|---|---|---|---|
| 20 | LH | 7.5 | 0.00018 | 3.5 | 1.5 | 0.022 |
| | HL | 6.5 | 0.0000025 | 3.5 | 1.5 | |
| 50 | LH | 12 | 0.00019 | 3.5 | 1.5 | 0.055 |
| | HL | 10 | 0.000015 | 3.5 | 1.5 | |
| 150 | LH | 18 | 0.00038 | 3 | 1.5 | 0.165 |
| | HL | 16 | 0.00006 | 3 | 1.5 | |
| 300 | LH | 21 | 0.0007 | 2.5 | 1.5 | 0.33 |
| | | 20 | 0.0002 | 2.5 | 1.5 | |

Polymer type Polymer B
relax time at 0.013
C[n] = 1
Salinity 3% TDS

| Conc. (ppm) | LHL | dB_max | relaxation time (s) | mean, u | std dev, σ | C[n] |
|---|---|---|---|---|---|---|
| 20 | LH | 7 | 0.000128 | 5 | 1.5 | 0.017 |
| | HL | 6 | 0.000003 | 5 | 1.5 | |

| Conc. (ppm) | LHL | dB_max | relaxation time (s) | mean, u | std dev, σ | C[n] |
|---|---|---|---|---|---|---|
| 50 | LH | 11 | 0.000132 | 4 | 1.5 | 0.042 |
|  | HL | 10 | 0.00001 | 4 | 1.5 |  |
| 150 | LH | 17 | 0.0002 | 3 | 1.5 | 0.127 |
|  | HL | 15 | 0.00003 | 3 | 1.5 |  |
| 300 | LH | 20 | 0.0004 | 3 | 1.5 | 0.253 |
|  |  | 19 | 0.00009 | 3 | 1.5 |  |

| Polymer type | Polymer C |
|---|---|
| relax time at C[n] = 1 | 0.056 |
| Salinity | 12% TDS |

| Conc. (ppm) | LHL | dB_max | relaxation time (s) | mean, u | std dev, σ | C[n] |
|---|---|---|---|---|---|---|
| 150 | LH | 21 | 0.0014 | 2 | 1.5 | 0.194 |
|  | HL | 19 | 0.0001 | 2 | 1.5 |  |

| Polymer type | Polymer C |
|---|---|
| relax time at C[n] = 1 | 0.38 |
| Salinity | 0.1% TDS |

| Conc. (ppm) | LHL | dB_max | relaxation time (s) | mean, u | std dev, σ | C[n] |
|---|---|---|---|---|---|---|
| 150 | LH | 23 | 0.195 | 2 | 1.5 | 0.774 |
|  | HL | 21 | 0.005 | 2 | 1.5 |  |

| Polymer type | Polymer C |
|---|---|
| relax time at C[n] = 1 | 0.096 |
| Salinity | 3.00% |

| Conc. (ppm) | LHL | dB_max | relaxation time | u | std dev | C[n] |
|---|---|---|---|---|---|---|
| 20 | LH | 19 | 0.001 |  |  | 0.032 |
|  | HL |  |  |  |  |  |
| 50 | LH | 21 |  | 3 | 1.5 | 0.08 |
|  | HL |  |  | 3 | 1.5 |  |
| 150 | LH | 22 | 0.0035 | 3.5 | 1.5 | 0.24 |
|  | HL | 22 | 0.0006 | 3.5 | 1.5 |  |
| 300 | LH | 22 | 0.016 | 3 | 1.5 | 0.48 |
|  | HL | 22 | 0.001 | 3 | 1.5 |  |

| Polymer type | Polymer D |
|---|---|
| relax time at C[n] = 1 | 0.338 |
| Salinity | 0.7% TDS |

| Conc. (ppm) | LHL | dB_max | relaxation time (s) | mean, u | std dev, σ | C[n] |
|---|---|---|---|---|---|---|
| 150 | LH | 24 | 0.03 | 2 | 1.5 | 0.515 |
|  | HL | 24 | 0.001 | 2 | 1.5 |  |

| Polymer type | Polymer D |
|---|---|
| relax time at C[n] = 1 | 0.28 |
| Salinity | 3.00% |

| Conc. (ppm) | LHL | dB_max | relaxation time | u | std dev | C[n] |
|---|---|---|---|---|---|---|
| 300 | LH | 24 |  | 2.5 | 1.5 | 1.02 |
| 150 |  | 22 | 0.084 | 2.5 | 1.5 | 0.51 |

Figure 19:
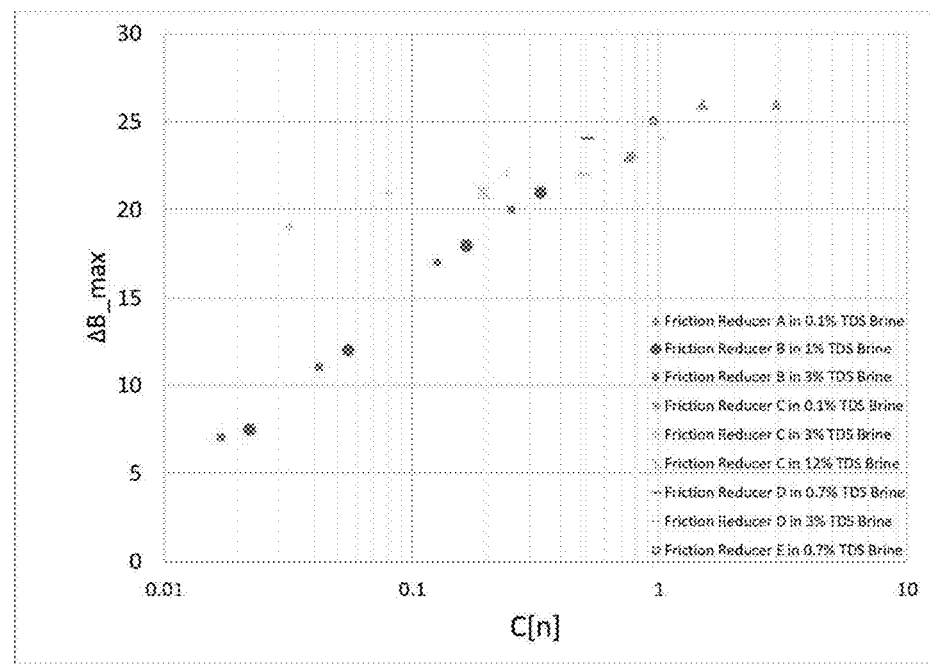
FIG. 19 shows ΔB max vs normalized concentration. The normalized concentration is concentration multiplied by intrinsic viscosity of the polymer, [n].
Figure 20:
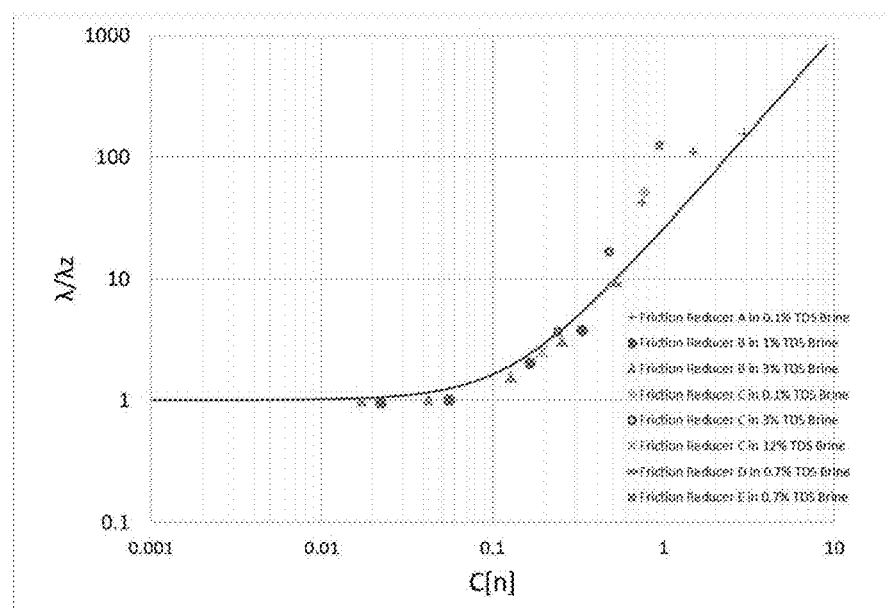
FIG. 20 shows normalized relaxation time vs. normalized concentration. The normalized concentration is concentration multiplied by intrinsic viscosity of the polymer, [n].

When normalized concentrations (concentration times intrinsic viscosity, C[n]) is plotted vs. $\Delta B_{max}$ for all friction reducers tested with lab flow-loop apparatus, the data appear to collapse into a master curve observed in FIG. 19. The master curve can be utilized for at least two purposes. First, the curve can be used to estimate friction reduction vs Wi plot a priori just from viscosity vs. shear rate and relaxation time measurements, reducing the time required for or completely eliminating flow-loop experiments. Second, the master curve can be used to select the molecular weight and concentration of friction reducers for optimum performance and/or economics. For example, to optimize FR performance per FR cost for a given water source with specific composition, select polymer molecular weight and concentration that gives C[n]=0.2 at the lowest FR cost.

What is claimed is:

1. A process comprising:
preparing a fluid mixture for an oil field operation or a pipeline operation, the fluid mixture comprising a concentration of a drag reducing agent determined based on a drag reduction parameter $\Delta B$ for the fluid mixture; and
using the fluid mixture in the oil field operation or the pipeline operation;
wherein the drag reduction parameter $\Delta B$ is defined by an equation:

$$\Delta B = \Delta B_{max} B_N$$

wherein $B_N = 0$ for $Wi < 1$ and $B_N = CDF$ for $0 < B_N < 1$ wherein $\Delta B_{max}$ is maximum drag reduction at $Wi \gg 1$, $B_N$ is normalized drag reduction as a function of shear, $Wi = \dot{\gamma}_w \lambda$ is Weissenberg number, $\dot{\gamma}_w$ is the wall shear rate, $\lambda$ is the longest relaxation time, and CDF is a cumulative distribution function.

2. The process of claim 1, wherein the process is a hydraulic fracturing process.

3. The process of claim 1, wherein the drag reduction parameter $\Delta B_{max}$ for the fluid mixture is from about 10 to about 70 wherein $\Delta B_{max}$ is the maximum drag reduction at $Wi \gg 1$ wherein $Wi = \dot{\gamma}_w \lambda$ and wherein Wi is Weissenberg number, $\dot{\gamma}_w$ is the wall shear rate, and $\lambda$ is the longest relaxation time.

4. The process of claim 1, wherein the drag reduction parameter $\Delta B_{max}$ for the fluid mixture is from about 15 to about 40 wherein $\Delta B_{max}$ is the maximum drag reduction at $Wi \gg 1$ wherein $Wi = \dot{\gamma}_w \lambda$ and wherein Wi is Weissenberg number, $\dot{\gamma}_w$ is the wall shear rate, and $\lambda$ is the longest relaxation time.

5. The process of claim 1, wherein the drag reduction parameter $\Delta B_{max}$ for the fluid mixture is from about 20 to about 35 wherein $\Delta B_{max}$ is the maximum drag reduction at $Wi \gg 1$ wherein $Wi = \dot{\gamma}_w \lambda$ and wherein Wi is Weissenberg number, $\dot{\gamma}_w$ is the wall shear rate, and $\lambda$ is the longest relaxation time.

6. The process of claim 1, wherein the concentration of the drag reducing agent in the fluid mixture is determined based on the drag reduction parameter $\Delta B$ for the fluid mixture and a relaxation time of the drag reducing agent.

7. The process of claim 1, further comprising:
measuring one or more fluid properties of the fluid mixture in a laboratory or a flow loop;
determining a small-scale drag reduction parameter $\Delta B$ for the fluid mixture based on the one or more fluid properties of the fluid mixture measured in the laboratory or the flow loop; and
upscaling the small-scale drag reduction parameter $\Delta B$ for use in the oil field operation or the pipeline operation.

8. The process of claim 1, further comprising:
measuring one or more fluid properties of the fluid mixture using a portable apparatus;
determining a small-scale drag reduction parameter $\Delta B$ for the fluid mixture based on the one or more fluid properties of the fluid mixture measured using the portable apparatus; and upscaling the small-scale drag reduction parameter ΔB for use in the oil field operation or the pipeline operation.

9. The process of claim 8, wherein the portable apparatus comprises:
a housing with an inlet to receive the fluid mixture from a fluid source and an outlet to expel the fluid mixture from the portable apparatus;
a pipe fluidly connected to the inlet to receive at least a portion of the fluid mixture and deliver the portion of the fluid mixture to the outlet; and
one or more instruments to measure the one or more fluid properties within the portable apparatus selected from a temperature of the fluid mixture proximate the inlet of the housing, an inlet pressure of the fluid mixture proximate the inlet of the housing, a flow rate of the portion of the fluid mixture within the pipe, a pressure differential of the portion of the fluid mixture across the pipe, an outlet pressure of the fluid mixture proximate the outlet of the housing, or any combination thereof.

10. A process comprising:
preparing a fluid mixture for an oil field operation or a pipeline operation, the fluid mixture comprising a concentration of a drag reducing agent determined based on a drag reduction parameter ΔB for the fluid mixture; and
using the fluid mixture in the oil field operation or the pipeline operation;
wherein the process further comprises:
measuring one or more fluid properties of the fluid mixture in a laboratory, a flow loop, a portable apparatus, or any combination thereof;
determining a small-scale drag reduction parameter ΔB for the fluid mixture based on the one or more fluid properties of the fluid mixture measured in the laboratory or the flow loop; and
upscaling the small-scale drag reduction parameter ΔB for use in the oil field operation or the pipeline operation;
wherein an analytical model is used for upscaling the small-scale drag reduction parameter ΔB for use in the oil field operation or the pipeline operation;
wherein the drag reduction parameter ΔB is defined by an equation:

$$\Delta B = \Delta B_{max} B_N$$

wherein $B_N=0$ for $Wi<1$ and $B_N=\text{CDF}$ for $0<B_N<1$ wherein $\Delta B_{max}$ is maximum drag reduction at Wi>>1, $B_N$ is normalized drag reduction as a function of shear, $Wi=\dot{\gamma}_w \lambda$ is Weissenberg number, $\dot{\gamma}_w$ is the wall shear rate, λ is the longest relaxation time, and CDF is a cumulative distribution function.

11. The process of claim 10, wherein an analytical model determines the drag reduction parameter ΔB for the fluid mixture based on one or more parameters selected from the small-scale drag reduction parameter ΔB for the fluid mixture, a relaxation time of the drag reducing agent, a Weissenberg number for the fluid mixture, a shear rate of the fluid mixture, a diameter of a conduit in the oil field operation or the pipeline operation, a wall roughness of the conduit, a wall shear stress in the conduit, a flow rate of the fluid mixture through the conduit, a viscosity of the fluid mixture, a density of the fluid mixture, a temperature of the fluid mixture, a molecular weight of the drag reducing agent, or any combination thereof.

12. The process of claim 10, further comprising:
measuring one or more actual fluid properties of the fluid mixture in the oil field operation or the pipeline operation; and
updating the analytical model based on the actual fluid properties of the fluid mixture in the oil field operation or the pipeline operation.

13. A process to determine drag reduction for a fluid mixture for an oil field operation or a pipeline operation comprising:
measuring one or more fluid properties of a fluid mixture comprising a concentration of a drag reducing agent in a laboratory, flow loop, or with a portable apparatus, or any combination thereof;
determining a small-scale drag reduction parameter ΔB for the fluid mixture based on the one or more fluid properties; and
upscaling the small-scale drag reduction parameter ΔB to determine a target fluid mixture for use in the oil field operation or the pipeline operation;
wherein the drag reduction parameter ΔB is defined by an equation:

$$\Delta B = \Delta B_{max} B_N$$

wherein $B_N=0$ for $Wi<1$ and $B_N=\text{CDF}$ for $0<B_N<1$ wherein $\Delta B_{max}$ is maximum drag reduction at Wi>>1, $B_N$ is normalized drag reduction as a function of shear, $Wi=\dot{\gamma}_w \lambda$ is Weissenberg number, $\dot{\gamma}_w$ is the wall shear rate, λ is the longest relaxation time, and CDF is a cumulative distribution function.

14. The process of claim 13, wherein measuring one or more fluid properties of the fluid mixture in the laboratory, flow loop, or with the portable apparatus comprises measuring the concentration of the drag reducing agent for a range of flow rates using at least one diameter of conduit.

15. The process of claim 13, wherein determining a small-scale drag reduction parameter ΔB for the fluid mixture based on the one or more fluid properties comprises plotting at least one of pressure gradient as a function of fluid flow rate, drag reduction percentage as a function of fluid flow rate, drag reduction percentage as a function of shear rate, drag reduction percentage as a Weissenberg Number, or any combination thereof.

16. The process of claim 13, wherein a concentration of the drag reducing agent in the target fluid mixture for use in the oil field operation or the pipeline operation is determined based on the small-scale drag reduction parameter ΔB and a relaxation time of the drag reducing agent.

17. The process of claim 13, wherein the portable apparatus comprises:
a housing with an inlet to receive the fluid mixture from a fluid source and an outlet to expel the fluid mixture from the portable apparatus;
a pipe fluidly connected to the inlet to receive at least a portion of the fluid mixture and deliver the portion of the fluid mixture to the outlet; and
one or more instruments to measure the one or more fluid properties within the portable apparatus selected from a temperature of the fluid mixture proximate the inlet of the housing, an inlet pressure of the fluid mixture proximate the inlet of the housing, a flow rate of the portion of the fluid mixture within the pipe, a pressure differential of the portion of the fluid mixture across the pipe, an outlet pressure of the fluid mixture proximate the outlet of the housing, or any combination thereof.

18. The process of claim 13, wherein an analytical model is used for upscaling the small-scale drag reduction parameter ΔB for use in the oil field operation or the pipeline operation.

19. The process of any one of claim 18, wherein the analytical model is used to design a well or completion, a pumping schedule or design, or any combination thereof.

20. The process of claim 13, wherein an analytical model determines the target fluid mixture for use in the oil field operation or the pipeline operation based on one or more parameters selected from the small-scale drag reduction parameter ΔB for the fluid mixture, a relaxation time of the drag reducing agent, a Weissenberg number for the fluid mixture, a shear rate of the fluid mixture, a diameter of a conduit in the oil field operation or the pipeline operation, a wall roughness of the conduit, a wall shear stress in the conduit, a flow rate of the fluid mixture through the conduit, a viscosity of the fluid mixture, a density of the fluid mixture, a temperature of the fluid mixture, a molecular weight of the drag reducing agent, or any combination thereof.

21. The process of claim 13, further comprising:

preparing the target fluid mixture for the oil field operation or the pipeline operation; and using the fluid mixture in the oil field operation or the pipeline operation.

22. The process of claim 21, further comprising:

measuring one or more actual fluid properties of the target fluid mixture in the oil field operation or the pipeline operation; and updating an analytical model based on the actual fluid properties of the target fluid mixture in the oil field operation or the pipeline operation.

23. The process of claim 13, wherein the drag reducing agent is a polymer, fiber, surfactant, booster, or any combination thereof.

24. The process of claim 13, wherein the determining of target fluid mixture comprises selecting a polymer molecular weight and concentration using plots of $\Delta B_{max}$ and relaxation time vs C[n].

* * * * *